United States Patent
Ng et al.

(10) Patent No.: US 10,614,258 B1
(45) Date of Patent: Apr. 7, 2020

(54) METHODS AND SYSTEMS FOR MODELING FLUID PROPERTY TRANSPORT IN PHYSICAL SYSTEMS

(71) Applicant: The MathWorks Inc., Natick, MA (US)

(72) Inventors: Leo W. Ng, Natick, MA (US); Jeffrey M. Wendlandt, Newton, MA (US)

(73) Assignee: The MathWorks Inc., Natick, MA (US)

(*) Notice: Subject to any disclaimer, the term of this patent is extended or adjusted under 35 U.S.C. 154(b) by 619 days.

(21) Appl. No.: 14/954,186

(22) Filed: Nov. 30, 2015

(51) Int. Cl.
*G06F 17/50* (2006.01)
*G06F 30/20* (2020.01)
*G06F 17/10* (2006.01)

(52) U.S. Cl.
CPC ............. *G06F 30/20* (2020.01); *G06F 17/10* (2013.01)

(58) Field of Classification Search
CPC .............................. G06F 17/5009; G06F 17/10
USPC ........................................................ 703/1, 2
See application file for complete search history.

(56) References Cited

U.S. PATENT DOCUMENTS 9,568,258 B1 2/2017 Colas et al.
2004/0167757 A1* 8/2004 Struijs ................. G06F 17/5018
703/2

OTHER PUBLICATIONS

Lawrence F. Shampine et al., "Solving Index 1 DAES in Matlab and Simulink," The MathWorks, Inc., Feb. 22, 1999, 15 pages.
(Continued)

*Primary Examiner* — Dwin M Craig
(74) *Attorney, Agent, or Firm* — Cesari and McKenna, LLP; Michael R. Reinemann

(57) ABSTRACT

A method performed by at least one processing unit comprises receiving a selection of a control volume associated with a physical system; receiving selections of a time dependent potential variable for the transported property and a time dependent flow variable for the transported property; receiving at least one fluid flow equation; determining an advection process; determining a diffusion process; determining a time dependent scaling factor based on at least the advection process and the diffusion process; deriving a rescaled transport flow equation for the time dependent flow variable for the transported property by adding the advection process and the diffusion process, and by applying the time dependent scaling factor for normalization; solving a plurality of equations that include the fluid flow equation and the rescaled transport flow equation; deriving the time dependent flow variable for the transported property; and deriving the time dependent potential variable for the transported property.

20 Claims, 12 Drawing Sheets

(56) References Cited

OTHER PUBLICATIONS

Ruediger Franke et al., "Stream Connectors—An Extension of Modelica for Device-Oriented Modeling of Convective Transport Phenomena," https://www.modelica.org/events/modelica2009/Proceedings/memorystick/pages/papers/0078/0078.pdf, Preceedings of the 7$^{th}$ Modelica Conference, Como, Italy, Sep. 20-22, 2009, 14 pages.

Sylvain Quoilin et al., "Methods to Increase the Robustness of Finite-Volume Flow Models in Thermodynamic Systems," http://www.mdpi.com/1996-1073/7/3/1621/htm, Energies, 2014, 20 pages.

Hisahiro Ito et al., "Equation-Based Model Date Structure for High Level Physical Modelling, Model Simplification and Modelica-Export," http://www.eoolt.org/2011/presentations/presentation_4.pdf, 4$^{th}$ EOOLT Workshop, Zurich, Switzerland, Sep. 2011, 56 pages.

\* cited by examiner

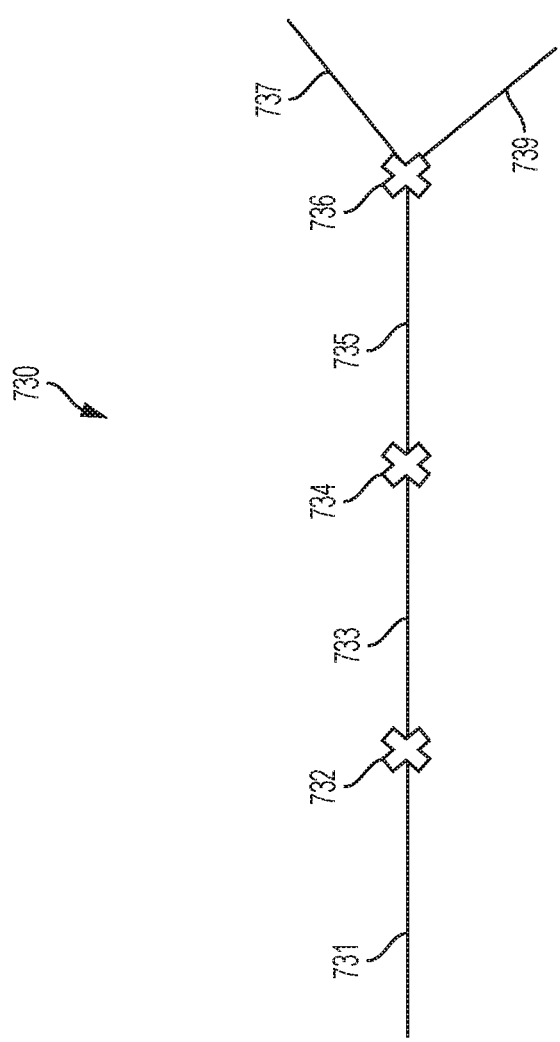

METHODS AND SYSTEMS FOR MODELING FLUID PROPERTY TRANSPORT IN PHYSICAL SYSTEMS

BACKGROUND

Disciplines such as engineering often need to determine the behavior of a physical system such as a machine or an electrical circuit under different conditions or at different times. For example, when designing a machine, an engineer may need to determine the physical properties of different parts of the machine to verify whether they meet some desired product standards. The engineer may, for example, need to determine the range of pressure or heat that different parts will sustain during operation and accordingly use appropriate materials for those parts. Moreover, the engineer may need to find the energy input and the energy output of the machine to determine its efficiency and whether that efficiency meets some efficiency standards.

In some cases, to test different designs of the physical system, an engineer may model the physical system. A model enables the engineer to predict the behavior of the machine under different conditions and with different designs, and accordingly find an optimum design at a preliminary stage without the need to build the machine.

In some physical systems, called fluid transport systems, a fluid flows in the system and transports with it one or more physical properties. In a refrigerator, for example, a refrigerant may flow through different parts of the system and transport with it physical properties such as heat. In some systems, the fluid may also transport other types of properties such as a trace material, water vapor, etc. An engineer may need to model the changes in the transported property. The engineer may, for example, need to find out how the concentration of energy or trace material changes in each part of the system.

Existing modeling systems, however, often fail to model some fluid transport systems under special conditions. One example is finding the changes in the transported property when the fluid flows relatively slowly or does not flow at all.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several exemplary embodiments consistent with the disclosure. Together with the description, the drawings serve to explain the principles of the disclosure.

In the drawings:

FIG. 7 shows an exemplary depiction of a model using an alternative representation according an embodiment.

DETAILED DESCRIPTION

Figure 1:
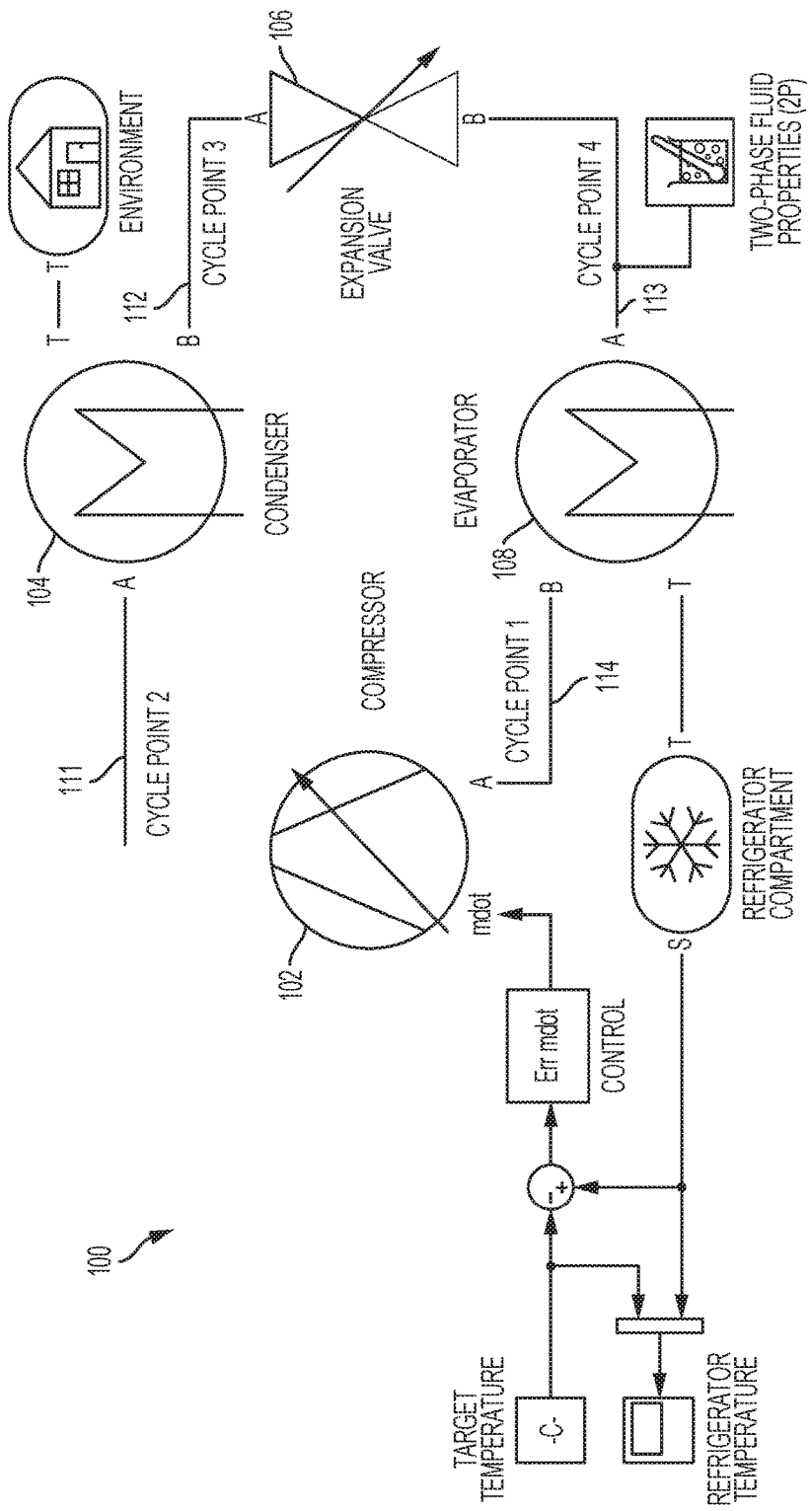
FIG. 1 illustrates a model for a refrigeration system according to an exemplary embodiment.

The following detailed description refers to the accompanying drawings. The same or similar reference numbers or names may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Summary of Sections

In what follows, section A introduces two exemplary physical systems, i.e., fluid flow systems and electrical flow systems, to which the disclosed modeling mechanisms can be applied. Sections B-F describe a general environment that various embodiments use for modeling physical systems. Section G describes the application of the general environment for modeling fluid transport systems. Section H describes the details and the problems of the advection models, which use the upwind method, for finding the flow variable for the transported property. Section I describes the details and the problems of the advection-diffusion models, which add the effect of diffusion to the advection models. Section J describes the smoothed and rescaled transport models, which address the problems of the advection models and the advection-diffusion models. Appendix A details a method for deriving a smoothed transport equation. Appendix B describes a more general scaling factor and its application in deriving the behavior of some physical systems.

A. Exemplary Physical Systems

Various embodiments enable one or more computer processing units to model physical systems under conditions that are beyond the reach of existing modeling systems. In one exemplary embodiment, the physical system is a fluid transport system. A fluid transport system may include a fluid that flows between different components of the system and transports physical properties such as heat or solvents. In various embodiment, the fluid may include a liquid, electricity, etc., as further discussed below. The transported property may have different physical characteristics (e.g., concentrations) in different parts or at different times. Also, the flow rate of the fluid may change over different parts or over time. In some parts or at some times, this flow rate may be zero or close to zero. These variances may cause the existing modeling systems to fail in correctly modeling the fluid transport system.

Various embodiments introduce techniques that enable modeling fluid transport systems such as those described above under conditions such as phase transition. One such fluid transport system is a refrigeration system.

FIG. 1 illustrates a refrigerator model 100 (also called refrigerator 100 for brevity) that models a refrigeration system according to an embodiment. Refrigerator 100 includes blocks that represent components of the refrigeration system. In various embodiments, a component may include one or more ports, each representing an interface through which the component interacts with other components. Two or more ports of two or more components may be connected via a line, indicating that the connected ports form interfaces that are shared among the corresponding components. A group of such two or more connected ports form a node. Therefore, in some embodiments, a group of one or more lines that connect two or more ports and intersect with each other are also called a node. In particular, refrigerator 100 includes blocks such as a compressor 102, a condenser 104, an expansion valve 106, and an evaporator 108. Moreover, refrigerator 100 includes nodes 111-114, through which the fluid flows between the components. The fluid paths may, for example, be pipes.

The fluid may flow between different parts of refrigerator 100 and may transport one or more physical properties with it. The fluid may, for example, transport heat from one part to another. Alternatively, it may transport some trace material that is suspended or dissolved in it. An engineer may need to predict the values of the physical characteristics of the transported property in different parts and at different times.

To model a physical system, a user may need to model its components and later combine them. Each of the components in model refrigerator 100, for example, itself may be a modeled unit that has some internal structure.

Figure 2:
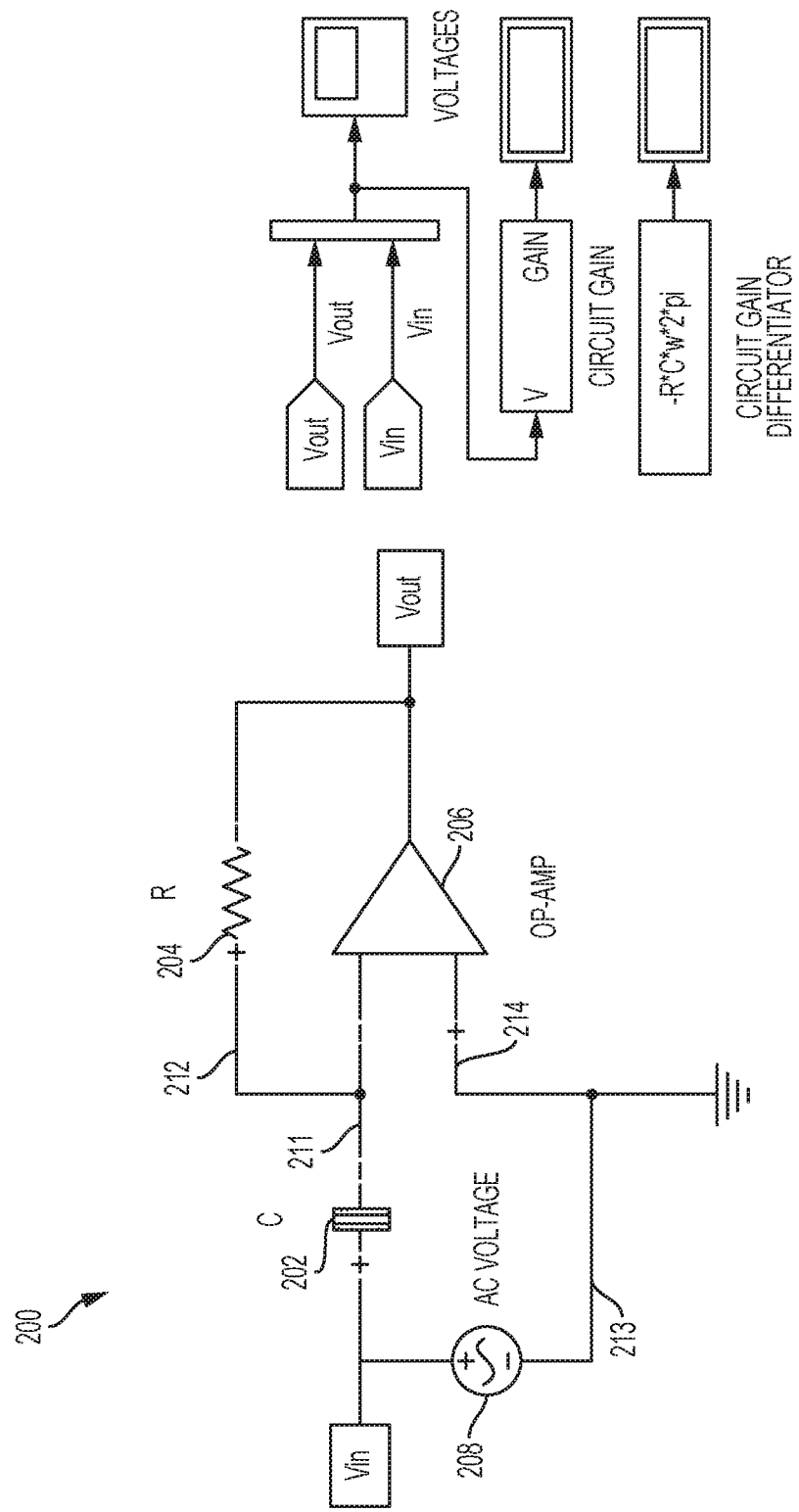
FIG. 2 is shows a model diagram for an Op-Amp differentiator circuit according to some exemplary embodiments.

Some embodiments enable modeling a physical system that employs other types of physical properties, such as electrical flow systems in which electricity flows. FIG. 2 shows an exemplary model for an electrical flow system according to an embodiment. In FIG. 2, the electrical flow system is an Op-Amp differentiator circuit 200 (also called Op-Amp circuit 200 for brevity) according to one exemplary embodiment. Op-Amp circuit 200 includes components such as a capacitor 202, a resistor 204, an op-Amp 206, and an AC voltage source 208. Op-Amp circuit 200 also includes connections between its components, e.g., connections 211-214. In some embodiments, the components are modeled by blocks and the connections are modeled by lines or nodes.

Various embodiments receive information related to physical systems such as refrigerator 100 of FIG. 1 or an Op-Amp circuit of FIG. 2, and generate graphical models such as models 100 and 200 for those systems.

B. Exemplary Device Architecture

Figure 3:
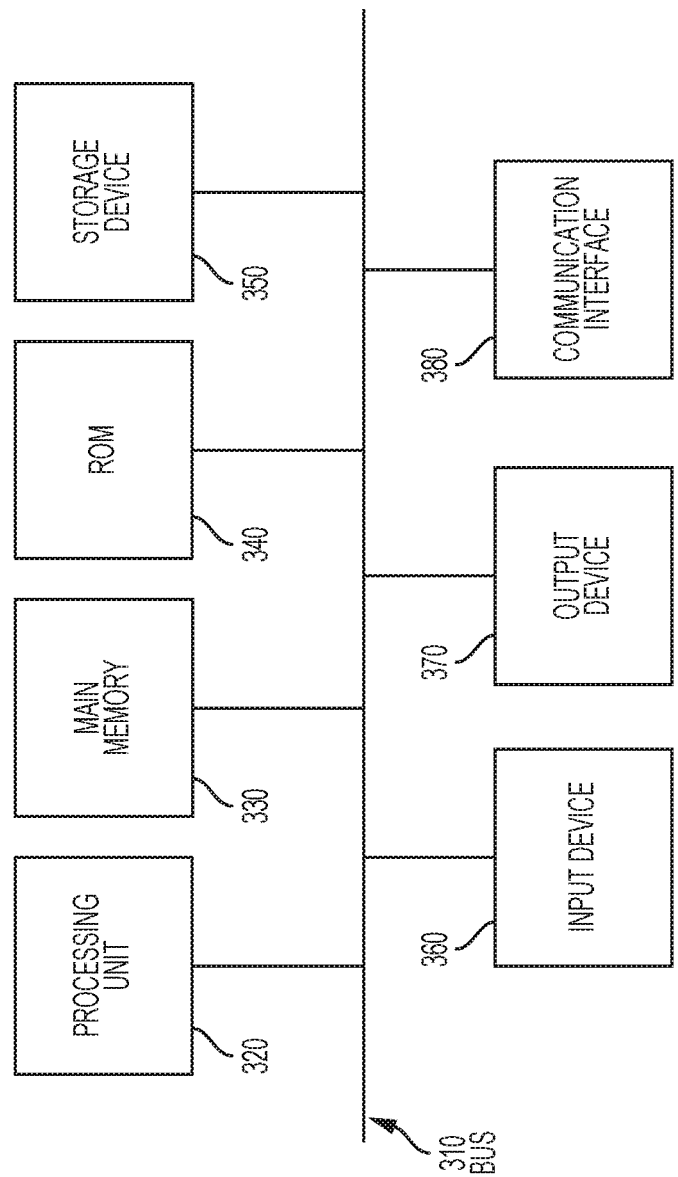
FIG. 3 is an exemplary diagram of a device used for modeling physical systems according to some exemplary embodiments.

In various embodiments, a general modeling environment uses one or more devices, such as computing devices, to generate graphical models for physical systems. FIG. 3 shows a diagram of an exemplary device 300 according to one exemplary embodiment. Device 300 may include one or more of a bus 310, a processing unit 320, a main memory 330, a read-only memory (ROM) 340, a storage device 350, an input device 360, an output device 370, and a communication interface 380.

Bus 310 may include a path that permits communication among the components of device 300.

Processing unit 320 may include one or more processors, microprocessors, or other types of processing units that may interpret and execute instructions.

Main memory 330 may include one or more random access memories (RAMs) or other types of dynamic storage devices that may store information or instructions for execution by processing unit 320.

ROM 340 may include one or more ROM devices or other types of static storage devices that may store static information or instructions for use by processing unit 320. Storage device 350 may include a magnetic or an optical recording medium and its corresponding drive.

Input device 360 may include a mechanism that permits a user to input information to device 300. Input device 360 may include a keyboard, a camera, an accelerometer, a gyroscope, a mouse, a pen, a microphone, voice recognition or biometric mechanisms, a remote control, a touch screen, a neural interface, etc.

Output device 370 may include a mechanism that outputs information to the user. Output device 370 may include a display, a printer, a speaker, etc.

Communication interface 380 may include a transceiver-like mechanism that enables device 300 to communicate with other devices, networks, or systems. For example, communication interface 380 may include mechanisms for communicating with another device or a system over a network.

As described here, device 300 may perform certain operations in response to processing unit 320 executing software instructions stored in a computer-readable medium, such as main memory 330. A computer-readable medium may be defined as a non-transitory computer-readable medium such as a non-transitory memory device. The memory device may include space within a single physical memory device or spread across multiple physical memory devices. The software instructions may be read into main memory 330 from another computer-readable medium, such as storage device 350, or from another device over communication interface 380. The software instructions stored in main memory 330 may cause processing unit 320 to perform some or all of the processes described here. Alternatively, hardwired circuitry may be used in place of or in combination with software instructions to implement processes described here. Thus, implementations described here are not limited to any specific combination of hardware circuitry and software.

C. Modeling Environment

Figure 4:
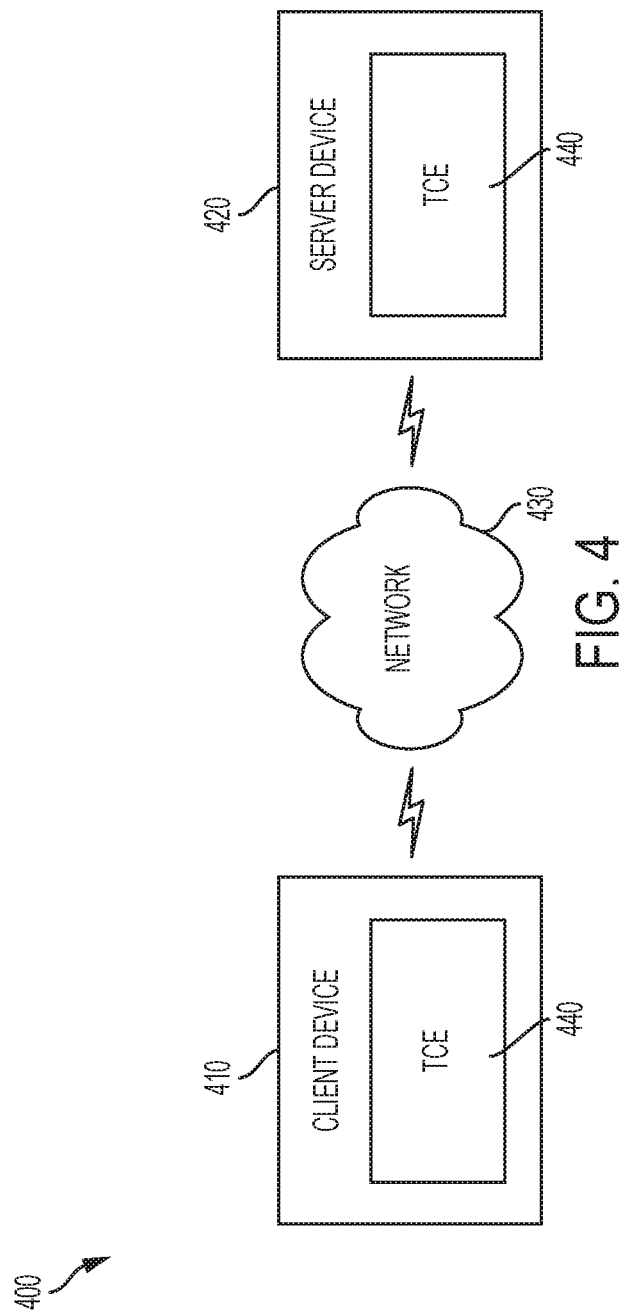
FIG. 4 is a diagram an exemplary modeling environment according to some exemplary embodiments.

Some embodiments model a physical system using a modeling environment that includes one or more computing devices such as those described above. In the modeling environment, the computing devices may interact with each other and may use a Technical Computing Environment (TCE). FIG. 4 is a diagram of such an exemplary modeling environment 400. One example of a modeling environment is the Simscape™ software by The MathWorks, Inc.

As illustrated in FIG. 4, modeling environment 400 includes a client device 410 interconnected with a server device 420 over a network 430. Different components of modeling environment 400 may interconnect over wired or wireless connections. In one exemplary embodiment, client device 410 and server device 420 may be provided in a single device or may be provided in separate devices.

Client device 410 may include one or more devices that are capable of communicating with server device 420 over network 430. For example, client device 410 may include a laptop computer, a personal computer, a tablet computer, a desktop computer, a workstation computer, a smart phone, a personal digital assistant (PDA), or other computation and communication devices.

Server device 420 may include one or more server devices, or other types of computation and communication devices, that gather, process, or provide information in a manner described here. Server device 420 may include a device that is capable of communicating with client device 410 (e.g., over network 430). In one example, server device 420 may include one or more laptop computers, personal computers, workstation computers, servers, central processing units (CPUs), graphical processing units (GPUs), application-specific integrated circuits (ASICs), field-programmable gate arrays (FPGAs), etc. Server device 420 may also include software (e.g., a simulator) executing on the aforementioned devices. Server device 420 may include a Technical Computing Environment (TCE) 440, detailed below, and may perform some or all of the functionalities described here for client device 410. Alternatively, server device 420 may be omitted and client device 410 may perform all of the functionalities described here for client device 410.

Network 430 may include a network such as a local area network (LAN), a wide area network (WAN), a metropolitan area network (MAN), a telephone network, such as the Public Switched Telephone Network (PSTN), an intranet, the Internet, or a combination of networks.

Client device 410 may further include a computer-readable medium that stores instructions for implementing TCE 440. Alternatively, or additionally, functionality of TCE 440 may be provided in another device (e.g., server device 420) that is accessible by client device 410. TCE 440 may include hardware or a combination of hardware and software that provides a computing environment that enables users to perform different tasks. The tasks may be related to disciplines, such as, but not limited to, mathematics, science, engineering, medicine, business, etc. Other types of computing environments may include an environment that requires the user to develop code in a conventional programming language, such as C++, C, Fortran, Pascal, etc. In one implementation, TCE 440 may include a dynamically-typed programming language (e.g., a MATLAB® language, a MATLAB-compatible language, a MATLAB-like language, etc.) that can be used to express problems or solutions to problems in mathematical notations. For example, TCE 440 may use an array as a basic element, where the array may not require dimensioning. In addition, TCE 440 may be adapted to perform matrix or vector formulations that can be used for data analysis, data visualization, application development, simulation, modeling, algorithm development, etc. These matrix or vector formulations may be used in many areas, such as statistics, image processing, signal processing, control design, life sciences modeling, discrete event analysis or design, state based analysis or design, etc.

TCE 440 may further provide mathematical functions or graphical tools (e.g., for creating plots, surfaces, images, volumetric representations, etc.). In one implementation, TCE 440 may provide these functions or tools using toolboxes (e.g., toolboxes for signal processing, image processing, data plotting, parallel processing, etc.). Alternatively, or additionally, TCE 440 may provide these functions as block sets or in another way, such as through a library, etc.

TCE 440 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes, etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes, SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

D. Technical Computing Environment

Figure 5:
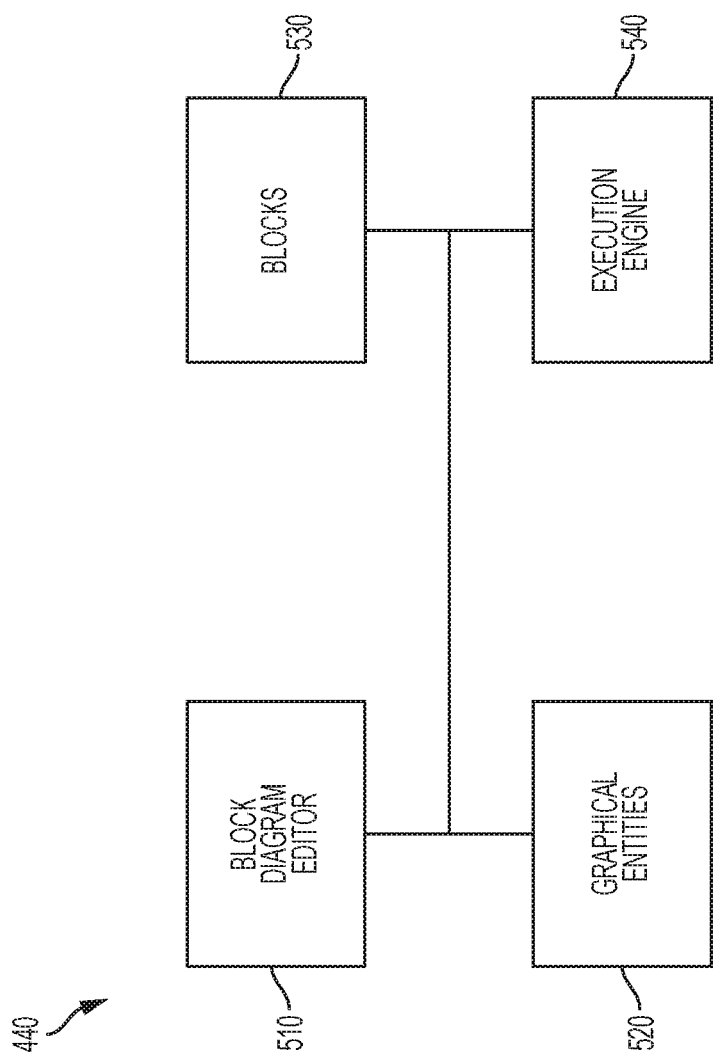
FIG. 5 is a diagram of exemplary functional components of a Technical Computing Environment according to some exemplary embodiments.

An exemplary implementation of a TCE may include multiple functional components. FIG. 5 is a diagram of exemplary functional components of TCE 440 according to one exemplary embodiment. In one implementation, the functions described in connection with FIG. 5 may be performed by one or more components of device 300 of FIG. 3 or by one or more devices 300. As shown in FIG. 5, TCE 440 may include a block diagram editor 510, graphical entities 520, blocks 530, or an execution engine 540.

Block diagram editor 510 may include hardware or a combination of hardware and software that may be used to graphically specify models of dynamic systems. In one implementation, block diagram editor 510 may enable a user to perform actions, such as construct, edit, navigate, display, annotate, save, or print a graphical model. A graphical model may include a block diagram that visually or pictorially represents a dynamic system. Block diagram editor 510 may enable a user to create or store data relating to graphical entities 520.

TCE 440 may provide a textual interface to permit interaction with block diagram editor 510. A user may write scripts that perform automatic editing operations on a model using the textual interface. A model may include one or more windows depending on, for example, whether the model is partitioned into multiple hierarchical levels.

Blocks 530 may include different components of a block diagram model. Blocks 530 may store fundamental mathematical elements of a block diagram model. Further, blocks 530 may include one or more of different types of basic blocks such as continuous-time integration blocks, data logging blocks, unit delay blocks, function-call generator blocks, etc. as further described below. In some embodiments, a block in a block diagram model includes these basic blocks.

Graphical entities 520 may include hardware or a combination of hardware and software. Graphical entities 520 may include different entities such as signal lines, buses, etc., and relations. In some embodiments, some entities are represented as blocks and some relations among entities are represented as lines connecting those blocks. Both entities and relations may have some attributes. In some embodiments, a model includes model elements that comprise entities, relations, and attributes used in the model. Some elements may represent how data may be communicated between functional or non-functional units and blocks 530 of a model.

Execution engine 540 may include hardware, or a combination of hardware and software for processing a graphical model to produce simulation results, may convert the graphical model into executable code, or may perform other analyses or related tasks. In one implementation, for a block diagram graphical model, execution engine 540 may translate the block diagram into an intermediate representation and into code such as source code or object code. For example, as detailed below, a connection between two blocks may indicate a relation between physical entities or equations assigned to those blocks. The executable entities may be compiled or executed on a device such as client device 410 to implement the functionality specified by the model.

TCE 440 may include a graphical modeling environment. In some implementations, a graphical modeling environment may include a block diagram environment for modeling, simulating, and/or executing a system using a block diagram, for automatically generating code for simulating the system, for testing or verifying the system, or the like. Additionally, or alternatively, a graphical modeling environment may include a state machine environment for modeling, simulating, and/or executing decision logic using a state machine, a flow chart, or the like. The graphical modeling environment may be associated with one or more elements (e.g., entities, such as graphical entities, textual entities, programming objects; relationships between entities; ports associated with entities; attributes of entities; etc.), as described in more detail elsewhere herein. In some implementations, the elements may be executable.

For example, TCE 440 may include a modeling environment that may be used in the creation of a functional model and that may enable generation of executable code based on the model. For example, TCE 440 may include a graphical modeling tool or application that provides a user interface for a numerical computing environment. Additionally, or alternatively, TCE 440 may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

The system represented by a model may have various execution semantics that may be represented in the model as a collection of modeling entities, sometimes referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

The modeling environment may provide one or more workspaces. A workspace may provide a data structure to store information that is accessible by the modeling environment. The workspace data structure may allow access to the data by an identifier such as a name. Data in the workspace may be hierarchically organized for example as objects and objects may contain other objects. Access to the contained objects may be by using a dot notation.

Each workspace may have its own scope for defining variables, defining functions, and resolving symbol usage. For example, there may be a base workspace that may be accessible by all models. In addition, each model may be provided with its own model workspace, and variables, functions, and symbols defined within the model are only visible to that model. For example, a model may include a Gain block whose gain is set to a variable, e.g., 'x' that is defined in the base workspace or in the model workspace. As another example, a model may include an Integrator block whose initial value is set to a variable, e.g., 'x' that is defined in the base workspace or in the model workspace.

A masked subsystem may be associated with a logical workspace that is local to the subsystem. Parameters and variables may be part of the model, optionally stored in the local workspace. The subsystem may permit an operator to provide layers of graphical models within a graphical model to facilitate containment, separation, and/or nesting for a part of the graphical model. The operator may descend into the subsystem view from the top level to view the details of this subsystem model. The masked subsystem may provide encapsulation to control the operation and interaction of the logical elements contained in a block diagram associated with the masked subsystem. The masked subsystem may enable the operator to create a self-contained functional unit that has application-specific parameters. The application-specific parameters are mapped to generic parameters of the underlying elements in the masked subsystem. The parameters and variables may also be available in a logical workspace that may be global to the model, a number of models, or to the graphical modeling environment.

A graphical model (e.g., a functional model) may include entities with relationships between the entities, and the relationships and/or the entities may have attributes associated with them. The entities may include, for example, blocks and/or ports. The relationships may include for example, lines (e.g., connector lines) and/or references (e.g., textual labels). The attributes may include, for example, value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., X=2Y) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations X=2Y+U and Y=3X−2U may be symbolically processed into one equation 5Y=−U. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally specific or consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. In some implementations, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

In some implementations, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

In some implementations, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

In some implementations, the graphical modeling environment may include one or more models. When the graphical modeling environment includes multiple models, the multiple models may be related. For example, a particular model may be a child model (e.g., a sub-model) of a parent model, or may be a parent model of a child model. Additionally, or alternatively, a particular model may reference another model. In some implementations, a model may be stored locally by client device 210. In some implementations, a model may be stored remotely by client device 210, such as by server device 230 (e.g., in a cloud computing environment).

E. Graphical Models

In various embodiments, TCE 440 models a physical system such as those represented in FIGS. 1 and 2, by generating a graphical model for that system. A graphical model may include some model entities with relations between those entities and the relations or the entities may have attributes associated with them. The entities may include model elements such as blocks or ports. The relations may include model elements such as nodes and references. The attributes may include model elements such as value information and meta information for the model element associated with the attributes.

Graphical models may also be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics or may be executable. An executable graphical model may be a time based block diagram. A time based block diagram may consist, for example, of blocks connected by lines. In some embodiments the lines may represent values that change over time or the blocks may represent functionality that is time dependent. In some embodiments, the time domain may be continuous time or it may be discrete time. Moreover, different values may be associated with lines at different times.

A block may represent a component of the physical system. The lines may represent signals (e.g., to specify input/output relation between blocks or to specify execution dependencies between blocks), variables (e.g., to specify information shared between blocks), physical connections (e.g., to specify electrical wires, pipes with volume flow, rigid mechanical connections, etc.), etc.

A relation between two blocks may be created by connecting them using a connection line. Different lines may also join at a branch point. A common branch point for the ports that represent physical connections may be a dynamic system. For example, at a branch point, all inflows may add up to zero. Also, a potential variable for different ports that share a branch point may be set equal to each other. Examples include the physics laws that indicate the sum of all currents that flow into a branch point should be zero. Similarly, the voltage of all lines that share a branch point should be the same at that point.

F. Physical Network Approach

The physical network approach is a mechanism that some modeling environments utilize for generating a graphical model. The physical network approach is suited for simulating systems that consist of physical components. This approach enables creation of a network representation of the system under design. Each system is represented, at least in part, by functional blocks that interact with each other by exchanging some physical properties, such as energy or a fluid, through their connecting lines. The physical network approach is further explained below in relation to FIGS. 6A and 6B.

Figure 6A:
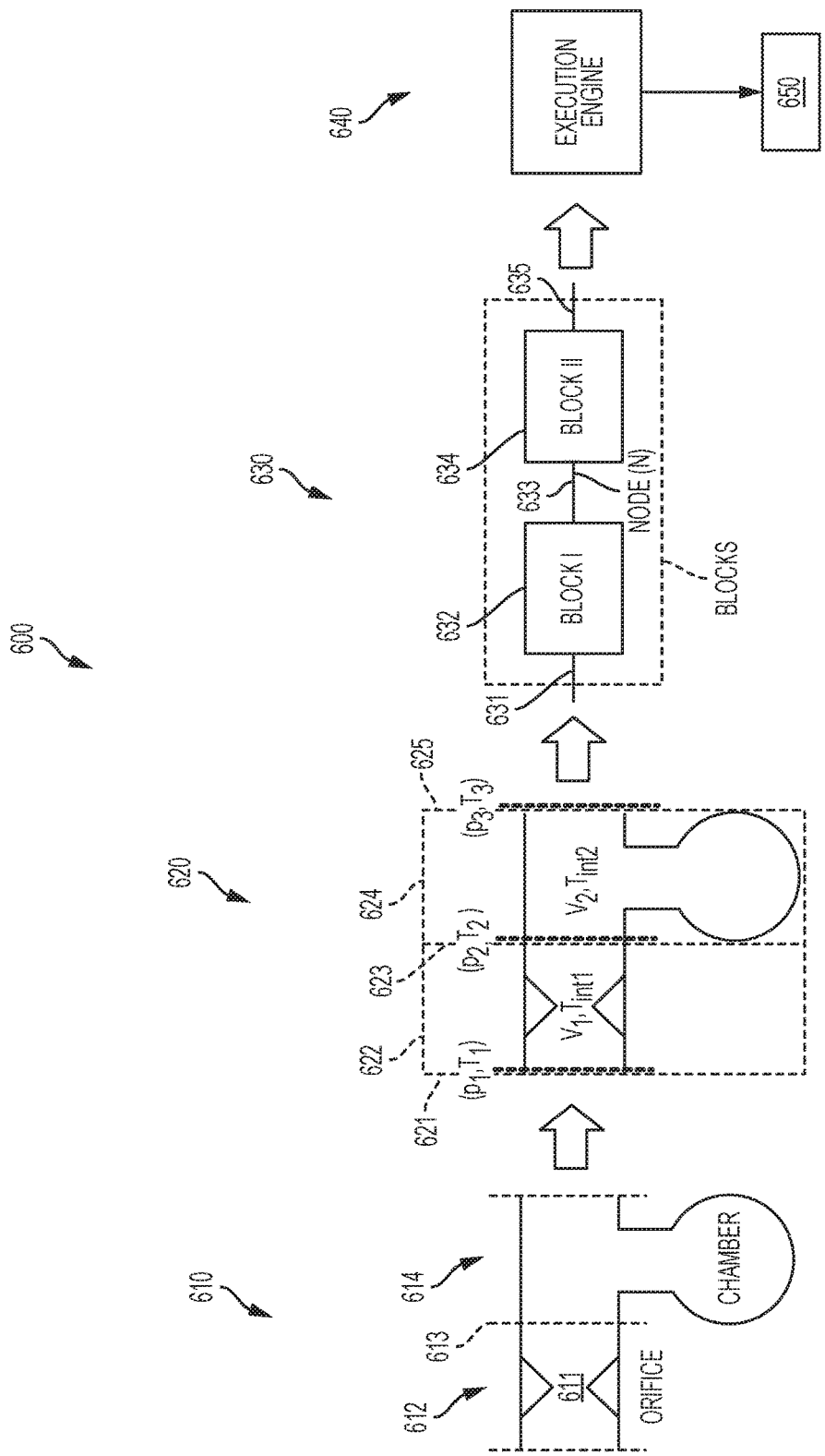
FIGS. 6A and 6B show diagrams of an exemplary application of a physical network approach according to some exemplary embodiments.
Figure 6B:
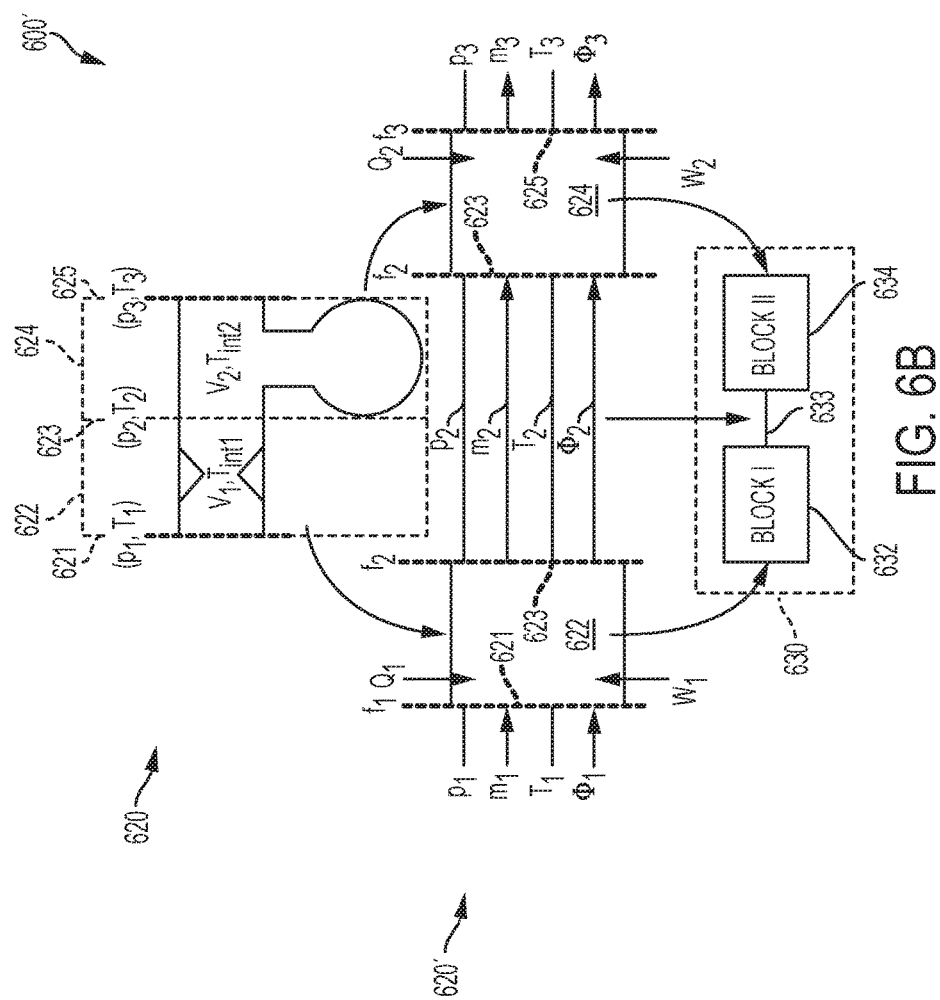

FIGS. 6A and 6B show diagrams 600 and 600', which depict an exemplary application of the physical network approach according to one exemplary embodiment. Diagrams 600 and 600' schematically depict the manner in which a graphical model is generated for a physical system. Diagrams 600 and 600' further depict a technique by which the graphical model is solved by an execution engine. In particular, diagram 600 shows a physical system 610, a physical network 620, a thermal fluid model 630, an execution engine 640 (also, for brevity, respectively called system 610, network 620, model 630, and engine 640), and a solution 650. Diagram 600', on the other hand, depicts network 620, a detailed version of network 620 shown as network 620', and model 630.

As further detailed below, network 620 is created based on, and represents, system 610. Further, model 630 is generated based on network 620. In some embodiments, TCE 440 generates model 630. Model 630 results in information and equations that are sent to engine 640. Engine 640 solves those equations and derives solution 650. Solution 650 may include information for describing or identifying the physical behavior of system 610. The physical behavior may include, for example, the time dependent behavior of one or more physical characteristics of the physical system or its components. In various embodiments, the physical characteristics may include energy, temperature, pressure, mass, enthalpy, electric current, electric potential, electrical charge, etc.

A physical system may include different physical components, such as pumps, condensers, Op-Amp differentiator circuits, etc. Each component may itself include more elementary components such as pipes, containers, chambers, orifices, capacitors, resistors, etc. As an example, in FIG. 6A, system 610 includes components such as an orifice 612 and a chamber 614. System 610 may be part of a larger thermal hydraulics system, e.g., part of refrigerator 100. Each component of system 610 may contain one or more fluids that flow through system 610.

Orifice 612 may include an opening 611 provided in a fluid conduit (e.g., a pipe), where a cross-sectional area of opening 611 is smaller than a cross-sectional area of the fluid conduit. Thus, orifice 612 may act to constrict the fluid flow in the fluid conduit.

Chamber 614, on the other hand, may include a compartment connected to the fluid conduit and may act as a reservoir for the fluid.

Further, orifice 612 and chamber 614 may be in fluid communication through an interface 613. The interface may include a mechanism that connects the corresponding components. The fluid may flow through an interface from the component on one side of the interface to the component on the other side. For example, the fluid may flow through interface 613 from orifice 612 to chamber 614 or vice versa.

Continuing with diagram 600 of FIG. 6A, a physical system such as system 610 may be represented by a physical network such as network 620. The physical network may include one or more control volumes and interfaces. A control volume may represent a volume that encompasses a component, part of a component, or a combination of multiple components. A control volume may also encompass the contents of a component, part of a component, or multiple components. An interface in the physical system may be represented in the physical network by an interface between two control volumes. Control volumes that share an interface may exchange through that interface one or more physical properties, such as a fluid, energy, electrical charge, etc. In the physical network approach, such exchanged entities may be called "information." In FIG. 6A, network 620 is created based on system 610. Network 620 includes control volumes 622 and 624, which may respectively represent orifice 612 and chamber 614 and their contents. Moreover, network 620 includes interface 623 that represents interface 613 in system 610. Interface 623 is, therefore, an interface of both control volumes 622 and 624. Control volumes 622 and 624 may exchange through interface 623 physical properties, such as the fluid that flows through the physical system. Moreover, because control volumes 622 and 624 share this interface, some of their characteristics at the interface may be the same. These characteristics may include, but are not necessarily limited to, the fluid pressure (for a fluid system) or the electric potential (for an electrical system). Other than their shared interface 623, each control volume may have other interfaces that are shared with other control volumes. Control volume 622, for example, may have an interface 621, which it may share with a third control volume on the left (not shown), and control volume 624 may have an interface 625, which it may share with a fourth control volume on the right (not shown).

Moreover, each control volume or interface of a physical network may have assigned to it characteristics that correspond to the physical characteristics of the corresponding component or interface, and the respective contents. For example, the fluid in each component or each interface in system 610 may have its own physical characteristics. In the physical network approach, these physical characteristics may be assigned to the corresponding control volume or interface in network 620. More specifically, the characteristics that correspond to the internal content of a component may be assigned as an internal characteristic to the corresponding control volume. On the other hand, the characteristics that correspond to an interface of a component may be assigned to the interface of the corresponding control volume.

For example, the fluid within orifice 612 may have a volume (V1) and an internal temperature (Tint1). Therefore, control volume 622 is assigned a volume V1 and an internal temperature Tint1. Similarly, the fluid within chamber 614 may have a volume (V2) and an internal temperature (Tint2), both assigned to control volume 624. The fluid at interface 613, on the other hand, may have a pressure (p2) and a temperature (T2), both of which are assigned to interface 623. Each of these different physical characteristics may by dynamic, that is, it may change with time.

Referring to FIG. 6B, network 620' shows some details of control volumes 622 and 624, and their interfaces. In particular, interface 621 of control volume 622 has assigned to it physical characteristics such as pressure P1, temperature T1, a flow rate $\dot{m}_1$, and a power flux $\phi_1$. Similarly, interface 625 of control volume 624 has assigned to it physical characteristics such as pressure P3, temperature T3, a flow rate $\dot{m}_3$, and a power flux $\phi_3$. A flow rate or a flux at an interface indicates the rate of flow into the control volume. A negative value for a flow rate or a flux indicates a flow that is exiting the control volume. In the drawings, the directions of the arrows are for illustration only and do not necessarily represent the conventional direction of a positive flow for each control volume.

Interface 623 has also physical characteristics assigned to it, which will be used in modeling each of control volumes 622 and 624, which share this interface. These physical characteristics include pressure P2, temperature T2, a flow rate $\dot{m}_2$, and a power flux $\phi_2$.

As a next step in the physical network approach, a physical network is represented by a thermal fluid model. More specifically, control volumes may be represented by blocks, and interfaces between control volumes may be represented by lines that connect the corresponding blocks. Moreover, two blocks may exchange information through the line that connect them. These exchanges may correspond to the exchange of physical properties between control volumes through their interfaces.

In some embodiments, the information is propagated and stored in the model using "potential" and "flow" variables. Each block may store the potential variables that correspond to the internal properties of the corresponding control volume in the physical network. Moreover, each line may store the flow variables that correspond to the properties of the corresponding interface in the physical network. Each block interacts with the rest of the model through these two types of variables, that is, the potential variables of the block and the flow variables of the lines that are connected to the block. In various embodiments, a potential variable may also be called an across variable, an independent variable, or an effort variable. A flow variable, on the other hand, may also be called a through variable or a conserved variable. In some embodiments, two or more connectors may join in a junction. For such a junction, the sum of the flow variables for the connectors is zero, while the value of the potential variable for different connectors are equal.

As an example, in diagram 600 of FIG. 6A, model 630 is generated based on network 620 in accordance with the physical network approach. TCE 440 may receive the information associated with network 620 and based on that information generates model 630. Model 630 may include an algorithmic model, a block diagram model, etc. produced by the TCE, as further described below.

Model 630 includes blocks 632 and 634 that respectively represent control volumes 622 and 624 of network 620. Moreover, model 630 includes a node 633 that connects blocks 632 and 634, forming a node that represents interface 623 in network 620.

In some embodiments, a set of information may be assigned to a block or to a node. A block, for example, may have assigned to it values of one or more parameters (e.g., the volume of the corresponding control volume); names of one or more variables that are defined for the block (e.g., internal density, internal pressure, etc.); and one or more equations, such as mass conservation differential equation or a physical relation, that apply to the block, as further discussed below. A node, similarly, may have assigned to it, among other things, the names of one or more variables that are defined for that node (e.g., interface pressure, interface temperature, interface flow rate, etc.).

In various embodiments, a physical system may include more components and interfaces, a physical network may include more control volumes and interfaces, and a model may include more blocks and nodes, compared to those shown in diagram 600. For example, model 630 may include a node 631 that corresponds to interface 621 in network 620 and connects block 632 to a block on the left (not shown). Further, model 630 may include a node 635 that corresponds to interface 625 in network 620 and connects block 634 to a block on the right (not shown).

Returning to FIG. 6A, as a next step in the physical network approach, information such as the parameters and equations generated by a model (such as model 630) may be provided to an execution engine (such as engine 640). The information may include the parameters, variables, and equations stored for each block and for each node. Data that engine 640 receives may include information such as characteristics (e.g., volumes, temperature, pressures, etc.) assigned to different blocks or nodes. The data may also include one or more equations that relate different characteristics, or differential equations that govern the evolution of different characteristics with time. These equations or differential equations may be based on physical laws that govern the physical system, such as laws of thermodynamics, fluid dynamics, electromagnetism, etc. The equations may include equations such as mass conservation equations, energy conservation equations, charge conservation equations, heat or mass diffusion equations, etc.

Engine 640 may process the received data to produce a solution 650, may convert the thermal fluid model into executable code, or may perform other analyses or related tasks. Solution 650 may include the dynamic behavior of system 610, i.e., values of different physical characteristics of system 610 as functions of time.

In one exemplary implementation, engine 640 may receive data associated with model 630 corresponding to system 610. In some embodiments, engine 640 receives data associated with a larger model that includes model 630. The larger model may correspond to a larger system, such as a refrigerator that includes system 610 as a component. The larger model may thus include blocks that include one or both of blocks 632 and 634.

Engine 640 may output solution 650 to a user of the TCE (e.g., using a display of a client device), or may store solution 650 (e.g., in a memory associated with the client device).

G. Physical Network Model for Fluid Transport Systems

As described below in more detail, various embodiments use a physical network approach to model a fluid transport system, in which a fluid flows and transports with it one or more transported properties. One example of a fluid transport system is refrigerator 100 of FIG. 1.

To model a fluid transport system, the system is divided into control volumes, as explained above. A physical system may be divided into multiple control volumes. Moreover, for each control volume, different characteristics, parameters, variables, or equations may be defined. The parameters for a control volume may include, for example, its volume, surface roughness, etc., or different characteristics of its fluid such as heat capacity, compressibility, density, viscosity, etc. The variables for the control volume may include one or more potential variables for the fluid, such as its pressure, density, temperature, enthalpy, etc. The variables may also include one or more flow variables for the fluid, such as its fluid flow rate or energy flow rate.

Further, the variables may include one or more potential variables and flow variables for one or more of the transported properties to be modeled. In a system like refrigerator 100, the transported property may be one or more of a trace material, water vapor, heat, etc. For these three transported properties, the potential variable may respectively be the mass fraction of a trace material, the partial pressure of the water vapor, and the energy u(t) (or alternatively temperature T) of the fluid. The flow variables, on the other hand, may respectively be the flow rate for the trace material, the flow rate for the water vapor, the flow rate for the energy of the fluid.

In some embodiments, determining the control volume may also include determining one or more relations among different variables. The relation may include, for example, a table of values or functional relations for determining a flow variable as a function of a potential variable.

An equation for modeling a control volume may include a relation among the parameters or variables defined for the control volume. One type of equation that may govern the flow of the fluid in a control volume is a conservation equation, e.g., a mass, momentum, or energy conservation equation. Some of the equations may be in the control volume form, also known as the integral form. In this form, the rate of change of a quantity (e.g., mass, momentum, and energy) inside the control volume is equal to the net flow rate of the quantity into the control volume plus the net gain or loss of the quantity due to sources and sinks inside the control volume. Examples of a control volume applied to numerical fluid simulation include the computational cell of a finite volume method or the internal volume of a physical component in a physical network model.

In some embodiments, to model a fluid transport system, the modeling system may alternatively represent blocks and nodes as internal nodes and external nodes, respectively. In this alternative representation, the modeling system represents a block as an internal node and assigns to it the internal characteristics of the block, i.e., the internal characteristics of the corresponding control volume. Moreover, the modeling system represents the nodes that connect to a block as external nodes that connect to the internal node associated with the block. The modeling system, therefore, uses external nodes to represent the interfaces of the corresponding control volume and assigns to each external node the characteristics of the corresponding interfaces.

FIG. 7 shows an exemplary depiction of a model 730 using the above-described alternative representation according an embodiment. Model 730 includes elements that are alternative representations of elements in model 630 of FIGS. 6A and 6B. In particular, model 730 includes internal nodes 732 and 734; and external nodes 731, 733, and 735. Internal nodes 732 and 734 are respectively alternative representations of blocks 632 and 634 of model 630, or equivalently, of control volumes 622 and 624 of networks 620 or 620'. External nodes 731, 733, and 735, on the other hand, are respectively alternative representations of nodes 631, 633, and 635 of model 630, or equivalently, of interfaces 621, 623, and 625 of networks 620 or 620'. In model 730, external nodes 731 and 733 are connected to internal node 732; and external nodes 733 and 735 are connected to internal node 734.

In addition to the above elements, model 730 further includes elements 736, 737, and 739, which illustrate an alternative representation of a control volume with more than two interfaces. Such a control volume may be represented by an internal node to which more than two external nodes are connected. In particular, in model 730, external nodes 735, 737, and 739 connect to internal node 736, indicating that the corresponding control volume has three interfaces.

To model the changes in properties (e.g., trace materials) that the fluid transports, some embodiments need to also determine the flow of the fluid itself. To that end, the embodiments use a fluid flow model. In a fluid flow model, the execution engine may receive one or more fluid flow equations, which govern the flow of the fluid into a control volume. Fluid flow equation (1) shows one example of a mass conservation equation that may be applied to a control volume to derive the flow rate of the fluid. Equivalently, fluid flow equation (1) may be applied to the internal and external nodes that correspond to that control volume and its interfaces.

Fluid Flow Equation (1)

$$\frac{d\rho(t)}{dt} * V = \sum_B \dot{m}_B$$

Fluid flow equation (1) is a differential equation. In fluid flow equation (1), ρ(t) is the density of the fluid inside the control volume as a function of time, and dρ(t)/dt is the derivative of this density with respect to time. Moreover, V is a volume assigned to the control volume. Density and volume are internal variables of the block and therefore correspond to the internal node of the control volume.

Moreover, in fluid flow equation (1), the right hand side includes a summation operator $\Sigma_B$, which sums over all boundary nodes B of the block. This sum is equivalent to a sum over all interfaces of the control volume. Each term of the sum ($\dot{m}_B$) is the flow rate of the fluid at a boundary node B (sometimes called fluid flow rate for brevity), which is equivalent to the rate of flow of the fluid into the control volume through the corresponding interface. By convention, for a fluid or a transported property, the flow is positive if the fluid or transported property flows into the control volume, and is negative if it flows out of the control volume. For internal node 736 of FIG. 7, for example, fluid flow equation (1) takes the form shown in fluid flow equation (1.1).

Fluid Flow Equation (1.1)

$$\frac{d\rho_{736}}{dt} * V_{736} = \dot{m}_{735} + \dot{m}_{737} + \dot{m}_{739}$$

In fluid flow equation (1), therefore, the left hand side measures the changes in the mass of the fluid in the control volume through the direct derivative of the density with respect to time. The right hand side, on the other hand, measures total flow of mass into the control volume through its interfaces (or the outflow of mass when a term is negative). The two sides are set to be equal to reflect the conservation of the mass, because any increase in the total mass inside the control volume (as derived by the left hand side of equation (1)) should come from an in-flow of mass through the interfaces of the control volume (as measured by the right hand side of equation (1)). In case the control volume includes a source (or sink) for creation (or destruction) of the conserved physical entity (such as mass or energy), the rate of creation is further added to the right hand side.

In some cases, in addition to fluid flow equation (1), the fluid flow model may include differential equations for other types of conservation. Fluid flow equation (1.2) shows one example of an energy conservation equation that may be applied to a control volume.

Fluid Flow Equation (1.2)

$$\frac{d(\rho(t) * u(t))}{dt} * V = Q - W$$

In fluid flow equation (1.2), u(t) is the energy of the fluid inside the control volume, Q is the net amount of heat that flows into the control volume through its interfaces, and W is the amount of work performed by the fluid in the control volume. In some embodiments, when the transported property is energy, u(t) is also the potential variable associated with the transported property.

Various embodiments derive the fluid flow to determine the behavior of the transported property in the control volumes. Some embodiments derive the change in a transported property, such a trace material, in a control volume based on the flow of the transported property into the control volume. As detailed below this transport may itself depend on the fluid flow. Transport equation (2) shows a representative equation for deriving the change.

Transport Equation (2)

$$\frac{dx_I}{dt} * V = \sum_B \varphi_B$$

In transport equation (2), $x_I$ is a time dependent potential variable for the transported property assigned to the internal node that corresponds to the control volume. For a trace material, for example, $x_I$ may be the mass fraction of the trace material inside the control volume. Further, in transport equation (2), $\Sigma_B$ is a sum over the boundary nodes that connect to the internal node; and $\varphi_B$ is the flow variable for the transported property at the corresponding boundary node. For a trace material, for example, $\varphi_B$ may be the flow rate of the trace material into the control volume through the corresponding interface. In transport equation (2), the left hand side determines the rate of change in the total amount of the transported property inside the control volume, while the right hand side determines the total flow of the transported property into the control volume. Transport equation (2) equates these two to indicate a conservation of the total amount of the transported property in the overall system.

Sections below describe different models for determining $\varphi_B$, the flow variable for the transported property, which is used for solving transport equation (2). As described below, the flow variable for the transported property may depend on different factors that may include the flow rate of the fluid.

H. Advection Models Using Upwind Method

Some embodiments use the advection model to find the flow variable for the transported property. In the advection model, the transported property is transported, at least in part, through the movement of the fluid. In the advection models, the flow variable for the transported property may be derived using the upwind method, in which the flow of the transported property has the same direction as the fluid flow, and is proportional to the magnitude of the fluid flow. Advection equation (3) shows an example of using the upwind method for deriving the flow variable for a transported property at a boundary node B.

Advection Equation (3)

$$\varphi_B = \begin{cases} \dot{m}_B * x_B & \text{if } \dot{m}_B > 0 \\ \dot{m}_B * x_I & \text{otherwise} \end{cases}$$

In advection equation (3), $\varphi_B$ is the flow variable for the transported property at the boundary node B, $\dot{m}_B$ is the fluid flow rate at B, $x_I$ is the time dependent potential variable for the transported property (also called transported property potential variable for brevity) for the internal node to which the boundary node B is connected, and $x_B$ is a transported property potential variable for the boundary node B.

Advection equation (3) indicates that the flow ($\varphi_B$) for the transported property results from, and is proportional to, advection along with the fluid ($\dot{m}_B$). Moreover, this flow is proportional to the transported property potential variable (e.g., mass fraction of the trace material) at the origin of the fluid flow. That is, if the fluid enters into the control volume through the interface, i.e., the fluid flow points from the boundary node towards the internal node (in which case $\dot{m}_B$ is positive), then the advection is proportional to $x_B$, the potential variable of the transported property at the boundary node B, that is, at the interface. Conversely, if the fluid exits the control volume through the interface, i.e., the fluid flow points from the internal node towards the boundary node (in which case $\dot{m}_B$ is negative), then the advection is proportional to $x_I$, the potential variable of the transported property at the internal node I, that is, inside the control volume. Advection equation (3) indicates that, in some embodiments, the transported property is propagated in the direction of the fluid flow. Moreover, advection equation (3) determines the flow of the transported property as a function of the variables at the internal and boundary nodes, and independent of other nodes.

In a graphical model, equations such as equations (1), (2), and (3) may be stored in the block or the nodes (e.g., internal and external nodes) that correspond to each control volume. When the blocks or nodes are transmitted to engine 640, the engine receives those equations along with other equations for the system, as a set of equations and solves those equations. The solution thus includes the time dependent potential variable for the internal node (i.e., $x_I$ (t)) which corresponds to a physical characteristic (e.g., mass fraction) of the transported property inside the control volume. The solution also includes the time dependent potential variables for each boundary node of the control volume (i.e., $x_B$ (t)), which correspond to the physical characteristic (e.g., mass fraction) of the transported property at the corresponding interfaces of the control volume. The solution, therefore, should determine the behavior of the transported property, e.g., the trace material, in different parts of the system.

Equations (2) and (3) are related to fluid flow equation (1) through the flow rate of the fluid at the boundary node, i.e., $\dot{m}_B$. Solving equations (2) and (3) to find the behavior of the transported property (e.g., $x_I$ and $x_B$, its potential variable at the internal and boundary nodes), thus depends on solving fluid flow equation (1) to find the behavior of the fluid flow (i.e., $\dot{m}_B$). In some cases, solving fluid flow equation (1) may itself depend on solving transport equations such as transport equation (2). For example, if the transported property is energy, its value may affect the fluid flow through equations such as fluid flow conservation (1.2), which are based on energy conservation.

The execution engine may solve the system of equations using a solver. The solver may solve a differential equation by discretizing continuous time into a sequence of discrete time steps. The discrete time steps enable the solver to approximate the time-derivative of a function by differences in the values of the function at different time steps. The approximation may produce a set of algebraic equations. The solver then solves this set of algebraic equations at each discrete time from the desired start time to the desired end time.

Examples of the solver include solvers ode15s, ode23t, ode14x. Different solvers may differ in the way they discretize time or in the way they approximate the time difference. Different solvers may also differ in their computational resource requirements or accuracy of their results. The ode15s solver, for example, is a variable-order solver based on the numerical differentiation formulas (NDFs). NDFs are related to, but are more efficient than the backward differentiation formulas (BDFs), which are also known as Gear's method. The ode15s solver numerically generates the Jacobian matrices. In some embodiments, the ode15s solver is recommended for solving stiff problems. In some embodiments, applying the solver ode15s starts by limiting the maximum order of the NDFs to 2.

The ode23t solver is an implementation of the trapezoidal rule using a "free" interpolant. In some embodiments, the ode23t solver is used for models that are moderately stiff and the user requires a solution without numerical damping.

The ode14x solver uses a combination of Newton's method and extrapolation from the current value to compute the value of a state at the next time step. A user may specify the number of Newton's method iterations and the extrapolation order that the solver uses to compute the next value of a model. To increase the accuracy of ode14x solver, one can select a larger number iterations or a higher extrapolation order. These increases, however, may cause a greater computational burden per step size.

In various systems, however, the solver faces difficulties in solving the system of differential equations. In particular, the solver may fail to solve the equations when for one or more of the control volumes the flow rate of the fluid at the boundary node, i.e., $\dot{m}_B$, is zero or close to zero. Such situations may occur, e.g., when the fluid flow changes direction in the control volume, which means that fluid flow rate $\dot{m}_B$ changes sign (e.g., from positive to negative or vice versa).

When fluid flow rate $\dot{m}_B$, changes sign, the right hand side of advection equation (3) behaves in a non-smooth manner. In particular, a first derivate of the right hand side (with respect to the flow rate $\dot{m}_B$) has two values ($x_B$ and $x_I$) on the two sides of the point at which $\dot{m}_B$ is zero (also called the zero fluid flow point). These two values are different for a control volume when the transported property potential variable is different at its boundary node and internal node. This difference, which can happen for various control volumes and at various times, causes the above-mentioned non-smooth behavior.

I. Advection-Diffusion Models

Some embodiments address the above-described non-smoothness of the advection-model by adding the effect of diffusion for deriving the behavior of the transported property, e.g., the behavior of the flow variable $\varphi_B$. The resulting model is called the advection-diffusion model.

The advection-diffusion model adds to the advection term on the right hand side of advection equation (3) a diffusion term that corresponds to the diffusion of the transported property across the boundary. Unlike the advection, the diffusion does not depend on the flow of the fluid. Instead, it may depend on the gradient of the transported property potential variable. In various embodiments, diffusion may be in the form of diffusion of a transported material due to molecular motion, diffusion of transported charge in the form of charge leakage, diffusion of transported energy due to thermal conduction, etc.

Diffusion Term (4) shows an example of determining the diffusion term as used in some advection-diffusion models according to some embodiments.

Diffusion term=$D*(x_B-x_I)$   Diffusion Term (4)

The diffusion as defined by diffusion term (4) is proportional to D, the diffusivity coefficient for the transported property in the fluid. The diffusion term is further proportional to $(x_B-x_I)$, the difference between $x_B$ (the transported property potential variable for the boundary node B) and $x_I$ (the transported property potential variable for the internal node I). In particular, diffusion term (4) is positive (i.e., the diffusion causes a flow through interface into the control volume or equivalently towards the internal node I), if $x_B$ is larger than $x_I$. Thus, the diffusion of a trace material, for example, is positive if the mass fraction of the trace material is higher at the boundary compared to inside the control volume. On the other hand, diffusion term (4) is negative (i.e., flows through the boundary away from the control volume or away from the internal node), if $x_B$ is smaller than $x_I$. These outcomes are consistent with the sign convention for flows, as described above. In some embodiments, the diffusivity coefficient D may be determined based on the physical properties of the physical system and stored as a parameter in the corresponding entity, i.e., block or node.

Advection-diffusion equation (5) shows an example of adding a diffusion term to the advection in the transport of a transported property. Equation (5) adds diffusion term (4) to advection equation (3) for deriving the flow variable for a transported property at a boundary node B.

Advection-Diffusion Equation (5)

$$\varphi_B = \begin{cases} \dot{m}_B * x_B + D*(x_B - x_I) & \text{if } \dot{m}_B > 0 \\ \dot{m}_B * x_I + D*(x_B - x_I) & \text{otherwise} \end{cases}$$

Advection-diffusion equation (5) is similar to advection equation (3) save the addition of diffusion term (4) to its right hand side. More specifically, on the right hand side, the first term is the advection term, representing the advection process (which is non-smooth at the zero fluid flow point) and the second term is diffusion term (4), representing the diffusion process.

In typical situations where $|\dot{m}_B|>>D$ (called the advection regime), the magnitude of the advection term is much larger than the magnitude of the diffusion term. In the advection regime, therefore, the diffusion term is negligible and the advection-diffusion equation (5) behaves similarly to the advection equation (3).

But near or at the zero fluid flow point (more specifically, where $|\dot{m}_B|<<D$), the advection term diminishes but the magnitude of diffusion term (4) does not diminish and instead becomes the main factor for the transport of the transported property. This situation is called the diffusion regime. Adding the diffusion term, therefore, may address some of the above-discussed difficulties that arise from diminishing $\varphi_B$.

While the advection-diffusion model reduces the effect of the diminishing advection term at the zero fluid flow point, it may not remove that effect of non-smoothness of the advection term. In particular, while the right hand side of advection-diffusion equation (5) does not reach zero at the zero fluid flow point, it nevertheless remains non-smooth due to the non-smooth behavior of the advection term. For example, the first derivative of the right hand side of advection-diffusion equation (5) is discontinuous for the same reasons detailed in relation to advection equation (3). This non-smoothness may pose a problem to a solver for solving the system of equations.

Another problem in solving the advection-diffusion model results from large fluctuations in the average size of terms in the model. In some embodiments, a solver may set the value of a tolerance when solving a differential equation. The tolerance may determine, for example, the size of the time steps. The solver may set the tolerance based on the average size of the term that dominates the equation, that is, has the largest absolute size. In advection-diffusion equation (5), however, this average size fluctuates significantly. In the advection regime, on the one hand, the advection term dominates, because its average absolute size is much larger than the average size of the diffusion term. In the diffusion regime, on the other hand, the advection term tends to zero and the diffusion term dominates. But, the average size of the advection term in the advection regime is typically much larger than the average size of the diffusion term in the diffusion regime. Because the physical system may be mostly in the advection regime, the solver may set its tolerance based on the (relatively) large size of the dominating advection term. When the system enters the diffusion regime, however, the relatively large tolerance does not fit the smaller size of the dominating diffusion term, and the solver may thus fail to correctly solve the differential equation.

Figure 8:
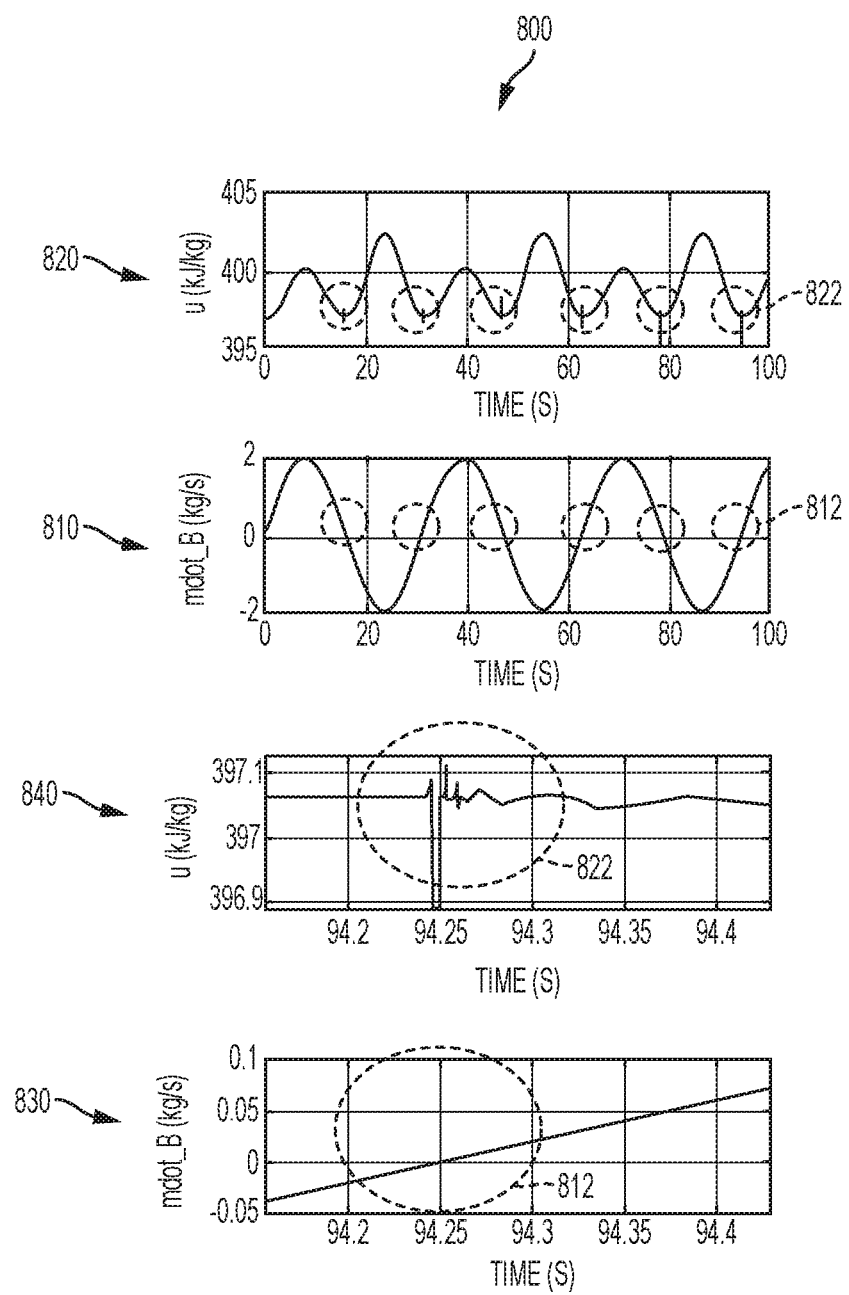
FIG. 8 shows a graph set that illustrates the effect of the non-smoothness of the advection according to an embodiment.

FIG. 8 shows an example of the failure of the solver due to the non-smoothness or the large fluctuations according to an embodiment. In this embodiment, the fluid transport system includes a control volume in which the fluid oscillates. The advection-diffusion model is used to derive the behavior of the energy in the control volume, as explained below.

FIG. 8 shows a graph set 800, which includes graphs 810, 820, 830, and 840. Graph 810 shows the behavior of the fluid flow rate ($\dot{m}_B$), graph 820 shows the behavior of a transported property (here energy). Graphs 830 and 840 illustrate zoomed views into graphs 810 and 820, respectively, to magnify one of the intervals that includes a diffusion regime.

More specifically, graph 810 is a graph of the fluid flow rate at a boundary node ($\dot{m}_B$, in kg/seconds) as a function of time (in seconds) in a time interval between 0 and 100 seconds. The fluid flow rate oscillates in this interval, indicating that the fluid periodically flows forward and backward in the control volume. During this interval, the fluid flow rate crosses the zero value ($\dot{m}_B=0$) six times, each circled by a broken-line circle. These circles, thus, mark the six zero fluid flow points in graph 810, which occur at six times (around 16, 31, 47, 62, 78, and 94 seconds) called zero flow rate times. The last zero fluid flow point (around 94 seconds) is also labeled point 812 for further reference. A zero fluid flow point and points in its vicinity may be parts of a diffusion regime.

Graph 820, on the other hand, is a graph of the energy of the fluid (u(t), in kJ/kg) as a function of time (in seconds). The energy in graph 820 is derived from a set of equations in an advection-diffusion model that considers energy as the transported property. In graph 820, the six broken-line circles mark points that correspond to the six zero fluid flow points in graph 810, that is, the points at the six zero flow rate times. The last point, labeled as point 822, for example, corresponds to the zero fluid flow point 812 in graph 810. Graph 820 shows a spike at each of the six zero flow rate times, indicating the failure of the execution engine to correctly solve the set of differential equations at or near those times, i.e., in the diffusion regimes.

This failure is depicted in more detail in graphs 830 and 840, which zoom into the graphs near the last zero flow rate time (around 94 seconds), i.e., zoom into the last diffusion regime. Graph 830 zooms into graph 810 near point 812, and graph 840 zooms into graph 820 near point 822. Graph 830 shows that the flow rate ($\dot{m}_B$) crosses the zero flow rate value at the zero flow rate time 94.25 seconds. Graph 840, on the other hand, shows that at and near the 94.25 second time, the solution for the energy (u(t)) deviates from a smooth behavior and instead shows a few spikes. This indicates that the execution engine fails to derive the correct behavior for u(t) near the zero fluid flow point.

J. Smoothed and Rescaled Transport Models

As explained above, previous modeling systems may fail to model a fluid transport system due the non-smoothness of the advection-diffusion model or the large fluctuations in its terms. As explained below, some embodiments remedy the failure by addressing the non-smoothness through removing or otherwise modifying the non-smooth conditional term in the advection terms. Smoothed transport flow equation (6) shows an example of a smoothed version of advection-diffusion equation (5) according to one such embodiment. Appendix A shows a method for deriving equation (6) from advection-diffusion equation (5).

Smoothed Transport Flow Equation (6)

$$\varphi_B = \frac{1}{2}\left(\dot{m}_B + \sqrt{\dot{m}_B^2 + 4D^2}\right)*x_B + \frac{1}{2}\left(\dot{m}_B - \sqrt{\dot{m}_B^2 + 4D^2}\right)*x_I$$

The abbreviations in smoothed transport flow equation (6) are the same as those of advection-diffusion equation (5). The flow variable $\varphi_B$, whether derived from smoothed transport flow equation (6) or from advection-diffusion equation (5), approaches the same values in various limiting cases, such as in the advection regime and in the diffusion regime. For example, in the advection regime (where $|\dot{m}_B|>>D$), both equations show that $\varphi_B$ tends to the value $\dot{m}_B*x_B$ (for $\dot{m}_B>0$) and to the value $\dot{m}_B*x_I$ (for $\dot{m}_B<0$). Similarly, in the diffusion regime (where $|\dot{m}_B|<<D$), both equations show that $\varphi_B$ tends to the value $D*(x_B-x_I)$. Unlike equation (5), however, equation (6) is smooth at the zero fluid flow point ($\dot{m}_B=0$). That is, its derivatives are continuous at $\dot{m}_B=0$ because, unlike advection-diffusion equation (5), smoothed transport flow equation (6) does not include the conditional terms based on the sign of the fluid flow rate $\dot{m}_B$.

Nevertheless, smoothed transport flow equation (6) may show large fluctuations in the average size of its terms similar to those seen for advection-diffusion equation (5). As explained below, some embodiments address these large fluctuations by introducing a time dependent scaling factor. The scaling factor may be added, for example, to the smoothed transport flow equation (6). In some embodiments, the time dependent scaling factor is derived from the physical characteristics of the system, such as the diffusivity of the transported property or the flow rate of the fluid. Scaling factor (7) shows an exemplary definition of a time dependent scaling factor.

$$\text{Scaling Factor} = 1/\sqrt{\dot{m}_B^2 + 4D^2} \quad\quad \text{Scaling Factor (7)}$$

Scaling factor (7) is defined as an inverse of a second order power mean of the fluid flow rate $\dot{m}_B$ and the diffusivity coefficient D. In some embodiments, the scaling factor depends on time through the time dependence of its terms. The changes in scaling factor (7), however, do not depend on some arbitrary factors and instead depend on changes in the physical system. Scaling factor (7) may change with time due to its dependence on the diffusivity (D) or on the flow rate of the fluid ($\dot{m}_B$). Appendix B includes a more general discussion of the behavior of the scaling factor and its application to remove large fluctuations in the physical equations and to enable the execution engine to solve for the behavior of a physical system Some embodiments revise the smoothed transport flow, such as that of equation (6), based on a scaling factor, such as scaling factor (7). For example, a revised version of smoothed transport flow equation (6) is shown in rescaled transport flow equation (8).

Rescaled Transport Flow Equation (8)

$$\frac{1}{\sqrt{\dot{m}_B^2 + 4D^2}} \varphi_B = \lambda_1 * x_B + \lambda_2 * x_I$$

Rescaled transport flow equation (8) can be derived from smoothed transport flow equation (6) by multiplying both sides by the scaling factor (7), and by further defining the factors $\lambda_1$ and $\lambda_2$ as shown in lambda definitions (9).

Lambda Definitions (9)

$$\lambda_1 \stackrel{def}{=} \frac{1}{2}\left(\frac{\dot{m}_B}{\sqrt{\dot{m}_B^2 + 4D^2}} + 1\right),$$

$$\lambda_2 \stackrel{def}{=} \frac{1}{2}\left(\frac{\dot{m}_B}{\sqrt{\dot{m}_B^2 + 4D^2}} - 1\right).$$

Rescaled transport flow equation (8) does not show the above-discussed large fluctuations seen in advection-diffusion equation (5). In particular, the right hand side of equation (8) is a linear combination of the two transported property potential variables for the boundary and internal nodes. Unlike advection-diffusion equation (5), the magnitudes of these two terms do not fluctuate significantly between the advection and the diffusion regimes. More specifically, both for very large fluid flow rates (i.e., $\dot{m}_B$ very large), and very small fluid flow rates (i.e., $\dot{m}_B$ near zero), both factors $\lambda_1$ and $\lambda_2$ are of an order of magnitudes close to one.

Various embodiments derive the behavior of a fluid transport system by combining a rescaled transport flow equation, such as equation (8), with fluid flow equations such equation (1) and transport equations such as equation (2). Such models are called rescaled transport models. The rescaled transport models do not show the non-smooth behavior or large fluctuation of terms seen in the advection or advection-diffusion models. Therefore, unlike those models, the rescaled transport models enable the execution engine to correctly derive the behavior of the transported property near the zero fluid flow point (i.e., near $\dot{m}_B$=0).

Figure 9:
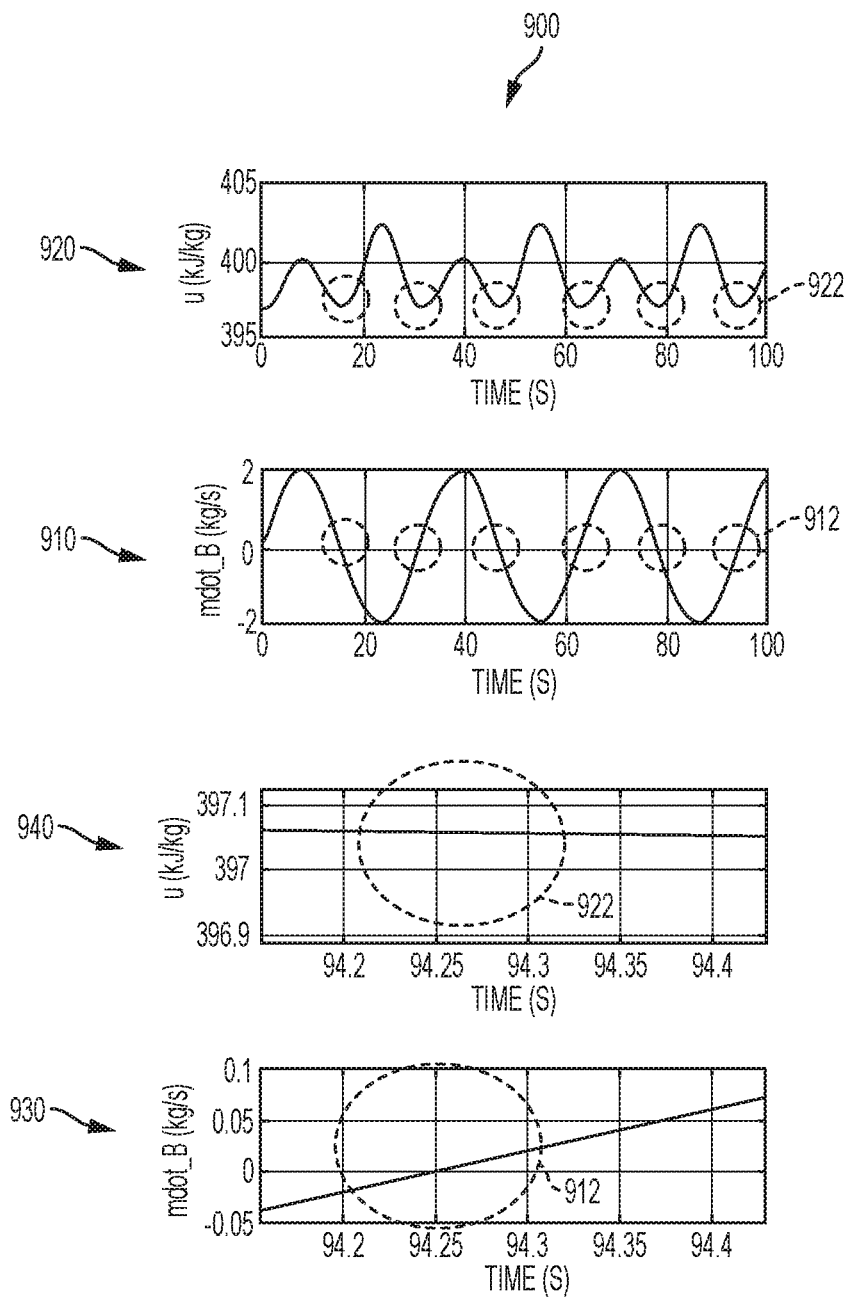
FIG. 9 shows a graph set that illustrates the results of applying the rescaled transport model to the same fluid transport system modeled in FIG. 8 according to an embodiment.

FIG. 9 shows a graph set 900, which illustrates the results of applying the rescaled transport model to the same fluid transport system modeled in FIG. 8. The variables, axes, and labels are similar to those of FIG. 8. In particular, in FIG. 9, graph 910 shows the behavior of the fluid flow rate ($\dot{m}_B$), graph 920 shows the behavior of a transported property (energy), and graphs 930 and 940 zoom into graphs 910 and 920 in the same interval that was zoomed into in graph set 800, that is, near points 912 and 922. In FIG. 9, graph 920 shows that, by using the rescaled transport model, the execution engine correctly derives a smooth behavior for the energy at and near the six zero flow rate times (marked by circles). This smooth behavior is further shown in the zoomed in graph 940, which shows that the energy changes smoothly and free from spikes at and near the last zero flow rate time (94.25 seconds).

Figure 10:
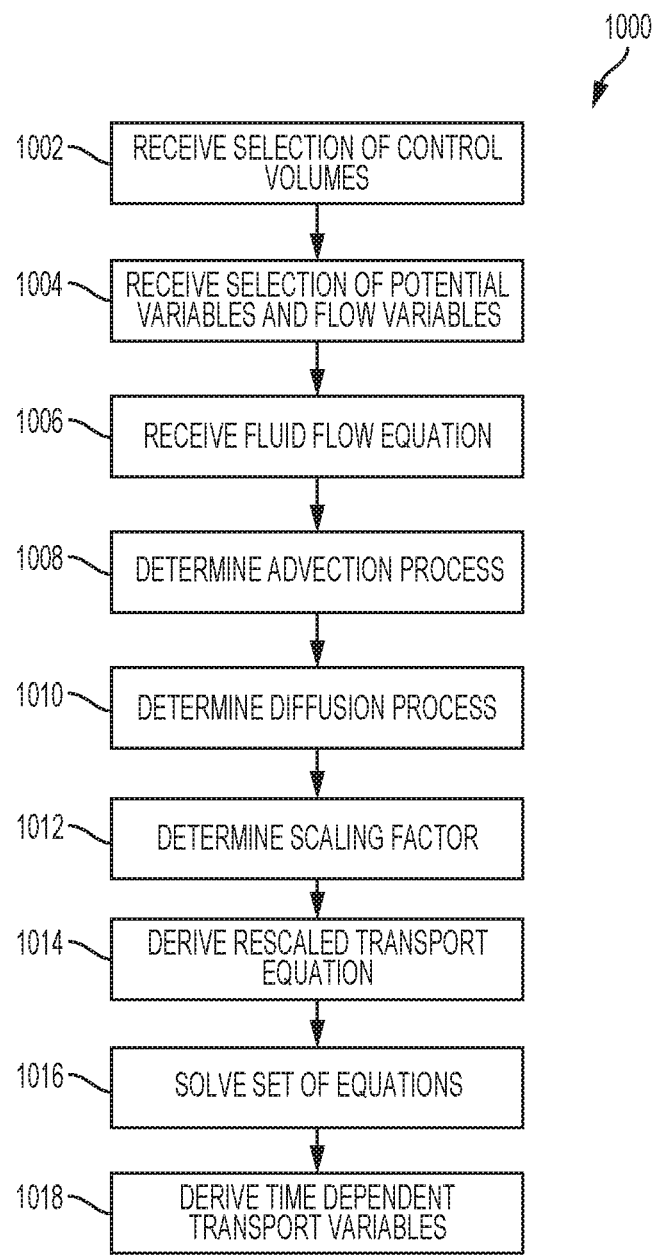
FIG. 10 shows a flow chart of a method for applying a rescaled transport model according to various embodiments.
Figure 11:
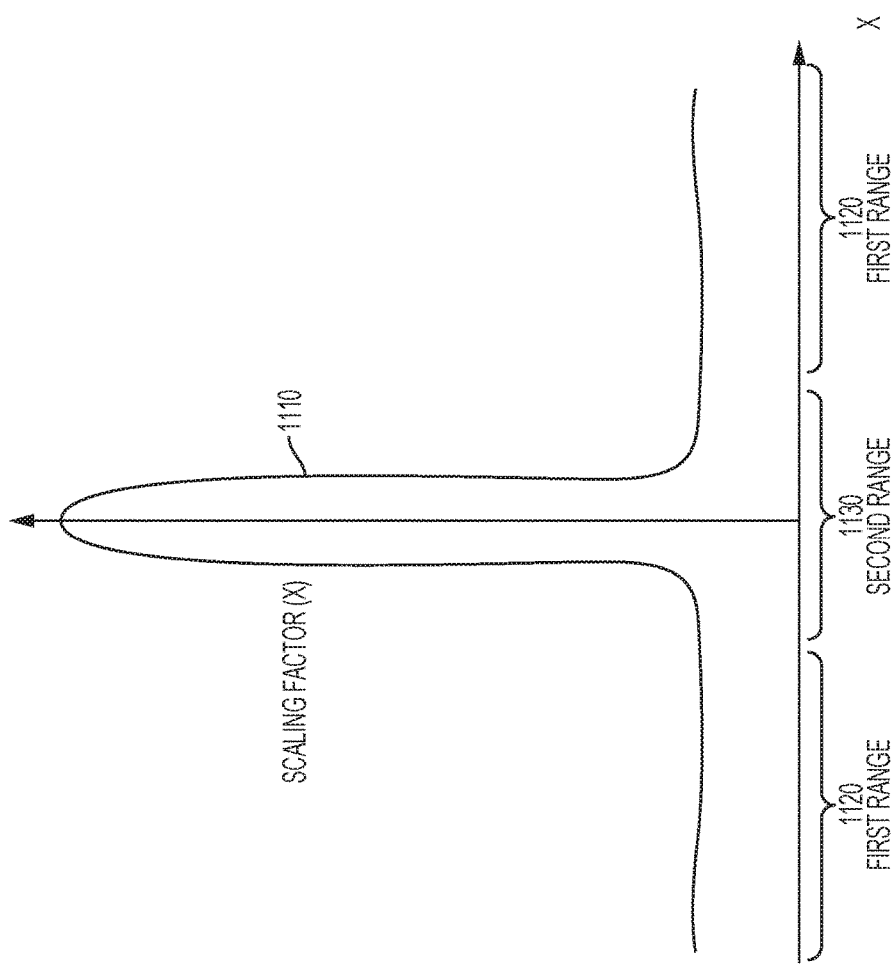
FIG. 11 shows a schematic of the behavior of an exemplary scaling factor for a physical equation according to various embodiments.

Some embodiments apply methods based on the rescaled transport model to derive the behavior of fluid transport systems. FIG. 10 shows a flow chart of a method 1000 for applying a rescaled transport model according to various embodiments. Method 1000 may be applied by one or more components of TCE 440, e.g., by engine 540. In some embodiments, TCE 440 performs the method using one or more devices such as device 300 or using one or more processors such as processing unit 320.

In step 1002, the TCE receives a selection of one or more control volumes for the fluid transport system. Examples of control volumes are described in relation to FIGS. 6A, 6B, and 7.

In step 1004, the TCE receives a selection of at least one pair of potential and flow variables for the transported property. The potential and flow variables may be, for example, the mass fraction and the flow rate of a trace material.

In step 1006, the TCE receives one or more fluid flow equations. The fluid flow equations may be equations for deriving the flow rate of the fluid through a control volume. The fluid flow equations may, for example, have the form shown in equation (1) or in equation (1.2).

In step 1008, the TCE determines an advection process for the transport of the transported property into the control volume. The advection process may include an advection of the transported property by the fluid flow. The advection process may depend on the flow rate of the fluid and one or more potential variables for the transported property. The advection process may, for example, have the form shown in advection equation (3).

In step 1010, the TCE determines a diffusion process for the transport of the transported property into the control volume. The diffusion of the transported property may depend on a gradient in the potential variable of the transported property across an interface of the control volume. The diffusion process may, for example, have the form shown in diffusion term (4).

In step 1012, the TCE determines a scaling factor. One example of such scaling factors is scaling factor (7). The scaling factor may depend on the diffusion process (e.g., through the diffusivity coefficient D) or on the advection process (e.g., through the flow rate of the fluid at the boundary node, i.e., $\dot{m}_B$). In some embodiments, the scaling factor depends on time. The scaling factor may, for example, change with time due to its dependence on the diffusion process or on the advection process.

In step 1014, the TCE derives a rescaled transport flow equation. In some embodiments, the rescaled transport flow equation may combine the advection process and the diffusion process, and may further apply the scaling factor to that combination. One example of such a rescaled transport flow equation is rescaled transport flow equation (8).

In step 1016, the execution engine solves a set of equations that includes the fluid flow equation and the rescaled transport flow equation. In one example, the set of equations may include fluid flow equation (1), transport equation (2), and a transport flow equation such as smoothed transport flow equation (6) or rescaled transport flow equation (8).

The set of equations may include the above equations for multiple control volumes. Each control volume may correspond to a component or part of a component of the physical system. For each of those multiple control volumes, the rescaled transport flow equation may be derived based on the potential and flow variables for the transported property as derived for the control volume.

Moreover, the set of equation may include equations for multiple transported properties. For example, in a fluid transport system, the fluid may transport two or more of trace materials, water vapor, and heat. In various embodiments, the execution engine may derive the behavior of the multiple transported properties by applying method 1000 to each of the transported properties. The set of equations may include a fluid flow equation for the fluid (e.g., equation (1)) and a set of equations for the multiple properties (e.g., for each transported property a transport equation such as equation (2) and a transport flow equation such as equation (6) or equation (7)).

The execution engine may derive the behavior of the one or more transported properties in the physical system by solving the set of equations. The execution engine may solve the set of equations using, for example, a solver program.

In step 1018, the TCE uses the solution to derive the behavior of the transported property. The behavior may include, for example, the values of the time dependent variables for the transported property. These variables may include the potential variables (e.g., mass faction of a trace material or energy of the fluid) inside the control volume (i.e., at the internal node) or at the interfaces of the control volumes (i.e., at the boundary nodes).

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature may exist in one or more embodiments.

In this disclosure the following qualifications apply, unless stated otherwise or deducted otherwise from the context. The terms "include," "comprise," "contain," and "have," when used after a set or a system, mean an open inclusion and do not exclude addition of other, non-enumerated, members to the set or to the system. Further, the conjunction "or" is used not exclusively but inclusively to mean and/or. Moreover, a subset of a set may include one or more than one, including all, members of the set. Also, the qualifier "some" may refer to a subset of a set that, therefore, may sometimes include all members of the set.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the described systems need not necessarily include all parts described in the embodiments, or may include multiple number of the described parts or other parts that are not described. Moreover, some parts of a system may perform tasks that are here described as being performed by one or more other parts. Accordingly, the embodiments are not limited to the above-described details, but instead are defined by the appended claims in light of their full scope of equivalents.

The invention claimed is:

1. A non-transitory computer-readable medium storing instructions for modeling a fluidic system in which a fluid flows within one or more control volumes of the fluidic system,
   the fluid transports one or more transported physical properties as the fluid flows,
   the one or more transported physical properties comprise one of a material in the fluid, a water vapor contained in the fluid, or an energy contained in the fluid,
   the fluid flows at a flow rate that is zero at a selected location of a control volume of the one or more control volumes, and
   modeling the fluidic system derives a physical characteristic of the one or more transported physical properties,
   one or more of the instructions to cause at least one processing unit to:
      identify an advection process for modeling the fluidic system that transports the one or more transported physical properties;
      identify a boundary of the control volume at which the flow rate of the fluid in the fluidic system is zero and a corresponding numerical non-smoothness occurs at the boundary in modeling the advection process of the fluidic system;
      identify a diffusion process for modeling the fluidic system that transports the one or more transported physical properties at the boundary;
      combine the advection process and the diffusion process to generate a model;
      determine a time dependent scaling factor based on the diffusion process and the flow rate;
      modify the model to generate a modified model based on applying the time dependent scaling factor for normalization,
         the modified model exhibiting smooth behavior at the boundary at which the flow rate is zero and enabling an execution engine to solve for a behavior of the fluidic system at the boundary at which the flow rate is zero due to the normalization;
      execute the modified model using the execution engine, the execution being carried out by the execution engine without the numerical non-smoothness at the boundary at which the flow rate is zero; and
      derive the physical characteristic of the one or more transported physical properties based on the execution of the modified model.

2. The non-transitory computer-readable medium of claim 1, wherein
   the one or more transported physical properties include a trace material in the fluid.

3. The non-transitory computer-readable medium of claim 1, wherein the one or more of the instructions cause the at least one processing unit to:
   determine, for the control volume, an internal node and at least one boundary node;
   select a time dependent boundary potential variable and a time dependent internal potential variable for the one or more transported physical properties;
   determine the advection process to depend on at least the time dependent boundary potential variable and the time dependent internal potential variable; and
   determine the diffusion process to depend on at least the time dependent boundary potential variable and the time dependent internal potential variable.

4. The non-transitory computer-readable medium of claim 1, wherein:
   an average size of the advection process is larger than an average size of the diffusion process; and
   the time dependent scaling factor increases in size when the advection process becomes smaller than the diffusion process.

5. The non-transitory computer-readable medium of claim 1, wherein:
the advection process is proportional to the flow rate of the fluid;
the diffusion process is proportional to a diffusivity coefficient; and
the time dependent scaling factor depends on at least the flow rate and the diffusivity coefficient.

6. The non-transitory computer-readable medium of claim 1, wherein:
the control volume is a first control volume and the one or more control volumes further include a second control volume; and
the model includes:
at least one fluid flow equation and a resealed transport flow equation for the first control volume;
at least one fluid flow equation and a resealed transport flow equation for the second control volume; and
a coupling equation that includes:
at least one of a time dependent flow rate of the fluid into the first control volume, a time dependent potential variable for the one or more transported physical properties for the first control volume, and a time dependent flow variable for the one or more transported physical properties for the first control volume; and
at least one of a time dependent flow rate of the fluid into the second control volume, a time dependent potential variable for the one or more transported physical properties for the second control volume, and a time dependent flow variable for the one or more transported physical properties for the second control volume.

7. The non-transitory computer-readable medium of claim 1, wherein the model includes a resealed transport flow equation of the form $$\frac{1}{\sqrt{\dot{m}_B^2 + 4D^2}} \varphi_B = \lambda_1 * x_B + \lambda_2 * x_I,$$

where:
$\dot{m}_B$ is the flow rate of the fluid,
D is a diffusivity coefficient for the transported property,
$\varphi_B$ is a time dependent flow variable for the one or more transported physical properties in the form of a flow rate of the one or more transported physical properties,
$x_B$ is a time dependent boundary potential variable at a boundary node,
$x_I$ is a time dependent internal potential variable at an internal node, $$\lambda_1 = \frac{1}{2}\left(\frac{\dot{m}_B}{\sqrt{\dot{m}_B^2 + 4D^2}} + 1\right), \text{ and}$$

$$\lambda_2 = \frac{1}{2}\left(\frac{\dot{m}_B}{\sqrt{\dot{m}_B^2 + 4D^2}} - 1\right).$$

8. The non-transitory computer-readable medium of claim 1, wherein the determine the time dependent scaling factor causes smoothing of the flow rate of the one or more transported physical properties.

9. The non-transitory computer-readable medium of claim 1, wherein the time dependent scaling factor changes continuously when the flow rate of the fluid crosses a zero value.

10. The non-transitory computer-readable medium of claim 1, wherein the fluidic system includes a refrigeration system.

11. A method for modeling a fluidic system in which a fluid flows within one or more control volumes of the fluidic system,
the fluid transports one or more transported physical properties as the fluid flows,
the one or more transported physical properties include one of a material in the fluid, a water vapor contained in the fluid, or an energy contained in the fluid,
the fluid flows at a flow rate that is zero at a selected location of a control volume of the one or more control volumes, and
modeling the fluidic system derives a physical characteristic of the one or more transported physical properties,
the method comprising:
identifying, by at least one processing unit, an advection process for modeling the fluidic system that transports the one or more transported physical properties;
identifying, by the at least one processing unit, a boundary of the control volume at which the flow rate of the fluid in the fluidic system is zero and a corresponding numerical non-smoothness occurs at the boundary;
identifying, by the at least one processing unit, a diffusion process for the modeling the fluidic system that transports the one or more transported physical properties at the boundary;
combining, by the at least one processing unit, the advection process and the diffusion process to generate a model;
determining, by the at least one processing unit, a time dependent scaling factor based on the diffusion process and the flow rate;
modifying, by the at least one processing unit, the model to generate a modified model based on applying the time dependent scaling factor for normalization,
the modified model exhibiting smooth behavior at the boundary at which the flow rate is zero and enabling an execution engine to solve for a behavior of the fluidic system at the boundary at which the flow rate is zero due to the normalization;
executing, by the at least one processing unit, the modified model using the execution engine, the execution being carried out by the execution engine without the corresponding numerical non-smoothness at the boundary at which the flow rate is zero; and
deriving, by the at least one processing unit, the physical characteristic of the one or more transported physical properties based on the executing the modified model.

12. The method of claim 11, wherein the one or more transported physical properties include a trace material in the fluid.

13. The method of claim 11, further comprising:
determining, by the at least one processing unit and for the control volume, an internal node and at least one boundary node;
selecting, by the at least one processing unit, a time dependent boundary potential variable and a time dependent internal potential variable for the one or more transported physical properties;
determining, by the at least one processing unit, the advection process to depend on at least the time dependent boundary potential variable and the time dependent internal potential variable; and determining, by the at least one processing unit, the diffusion process to depend on at least the time dependent boundary potential variable and the time dependent internal potential variable.

14. The method of claim 11, wherein:
an average size of the advection process is larger than an average size of the diffusion process; and
the time dependent scaling factor increases in size when the advection process becomes smaller than the diffusion process.

15. The method of claim 11, wherein:
the advection process is proportional to the flow rate of the fluid;
the diffusion process is proportional to a diffusivity coefficient; and
the time dependent scaling factor depends on at least the flow rate and the diffusivity coefficient.

16. The method of claim 11, wherein:
the control volume is a first control volume and the one or more control volumes further include a second control volume; and
the model includes:
at least one fluid flow equation and a rescaled transport flow equation for the first control volume;
at least one fluid flow equation and a rescaled transport flow equation for the second control volume; and
a coupling equation that includes:
at least one of a time dependent flow rate of the fluid into the first control volume, a time dependent potential variable for the one or more transported physical properties for the first control volume, and a time dependent flow variable for the one or more transported physical properties for the first control volume; and
at least one of a time dependent flow rate of the fluid into the second control volume, a time dependent potential variable for the one or more transported physical properties for the second control volume, and a time dependent flow variable for the one or more transported physical properties for the second control volume.

17. The method of claim 11, wherein the model includes a rescaled transport flow equation of the form $$\frac{1}{\sqrt{\dot{m}_B^2 + 4D^2}} \varphi_B = \lambda_1 * x_B + \lambda_2 * x_I,$$

and wherein:
$\dot{m}_B$ is the flow rate of the fluid,
D is a diffusivity coefficient for the one or more transported physical properties,
$\varphi_B$ is the time dependent flow variable for the transported property in the form of a flow rate of the one or more transported physical properties,
$x_B$ is a time dependent boundary potential variable at a boundary node,
$x_I$ is a time dependent internal potential variable at an internal node, $$\lambda_1 = \frac{1}{2}\left(\frac{\dot{m}_B}{\sqrt{\dot{m}_B^2 + 4D^2}} + 1\right), \text{ and}$$

$$\lambda_2 = \frac{1}{2}\left(\frac{\dot{m}_B}{\sqrt{\dot{m}_B^2 + 4D^2}} - 1\right).$$

18. The method of claim 11, wherein the fluidic system includes a refrigeration system.

19. A system for modeling a fluidic system in which a fluid flows within one or more control volumes of the fluidic system,
the fluid transports one or more transported physical properties as the fluid flows,
the one or more transported physical properties include one of a material in the fluid, a water vapor contained in the fluid, or an energy contained in the fluid,
the fluid flows at a flow rate that is zero at a selected location of a control volume of the one or more control volumes, and
modeling the fluidic system derives a physical characteristic of the one or more transported physical properties,
the system comprising:
at least one processing unit configured to:
identify an advection process for the modeling the fluidic system that transports the one or more transported physical properties;
identify a boundary of the control volume at which the flow rate of the fluid in the fluidic system is zero and a corresponding numerical non-smoothness occurs at the boundary;
identify a diffusion process for the modeling the fluidic system that transports the one or more transported physical properties at the boundary;
combine the advection process and the diffusion process to generate a model;
determine a time dependent scaling factor based on the diffusion process and the flow rate;
modify the model to generate a modified model based on applying the time dependent scaling factor for normalization,
the modified model exhibiting smooth behavior at the boundary at which the flow rate is zero and enabling an execution engine to solve for a behavior of the fluidic system at the boundary at which the flow rate is zero due to the normalization;
execute the modified model using the execution engine, the execution being carried out by the execution engine without the corresponding numerical non-smoothness at the boundary at which the flow rate is zero; and
derive the physical characteristic of the one or more transported physical properties based on the executing the modified model.

20. The system of claim 19, wherein the fluidic system includes a refrigeration system.

* * * * *

UNITED STATES PATENT AND TRADEMARK OFFICE
CERTIFICATE OF CORRECTION

PATENT NO. : 10,614,258 B1  
APPLICATION NO. : 14/954186  
DATED : April 7, 2020  
INVENTOR(S) : Leo W. Ng et al.

Page 1 of 1

It is certified that error appears in the above-identified patent and that said Letters Patent is hereby corrected as shown below:

In the Claims

Claim 6:
Column 29, Lines 15-17 reads:
"at least one fluid flow equation and a resealed transport
flow equation for the first control volume;
at least one fluid flow equation and a resealed transport"
Should read:
--at least one fluid flow equation and a rescaled transport
flow equation for the first control volume;
at least one fluid flow equation and a rescaled transport--

Claim 7:
Column 29, Line 36 reads:
"1, wherein the model includes a resealed transport flow"
Should read:
--1, wherein the model includes a rescaled transport flow--

Claim 16:
Column 31, Line 25 reads:
"at least one fluid flow equation and a resealed transport"
Should read:
--at least one fluid flow equation and a rescaled transport--

Signed and Sealed this
Eleventh Day of August, 2020

Andrei Iancu
*Director of the United States Patent and Trademark Office*